(12) United States Patent
Jakowski et al.

(10) Patent No.: US 8,768,751 B2
(45) Date of Patent: Jul. 1, 2014

(54) ENTERPRISE GAMIFICATION SYSTEM FOR AWARDING EMPLOYEE PERFORMANCE

(75) Inventors: Juergen Jakowski, Speyer (DE); Brian Craig McKellar, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/456,037

(22) Filed: Apr. 25, 2012

(65) Prior Publication Data
US 2013/0291065 A1    Oct. 31, 2013

(51) Int. Cl.
*G06Q 10/00* (2012.01)

(52) U.S. Cl.
USPC .................................. 705/7.42; 705/7.38

(58) Field of Classification Search
CPC ............... G06Q 30/0236; G06Q 10/06398
USPC ................................. 705/7.38, 7.42
See application file for complete search history.

(56) References Cited

U.S. PATENT DOCUMENTS

| | | | | |
|---|---|---|---|---|
| 5,034,807 A | * | 7/1991 | Von Kohorn | 725/5 |
| 5,128,752 A | * | 7/1992 | Von Kohorn | 705/7.29 |
| 5,202,826 A | * | 4/1993 | McCarthy | 705/14.17 |
| 5,239,460 A | * | 8/1993 | LaRoche | 705/7.42 |
| 5,535,256 A | * | 7/1996 | Maloney et al. | 379/309 |
| 5,621,789 A | * | 4/1997 | McCalmont et al. | 379/265.06 |
| 5,697,844 A | * | 12/1997 | Von Kohorn | 463/40 |
| 5,743,746 A | * | 4/1998 | Ho et al. | 434/332 |
| 5,774,870 A | * | 6/1998 | Storey | 705/14.27 |
| 5,794,210 A | * | 8/1998 | Goldhaber et al. | 705/14.69 |
| 5,907,831 A | * | 5/1999 | Lotvin et al. | 705/14.27 |
| 5,916,024 A | * | 6/1999 | Von Kohorn | 463/40 |
| 6,049,779 A | * | 4/2000 | Berkson | 705/14.39 |
| 6,226,621 B1 | * | 5/2001 | Warsh | 705/14.36 |
| 6,251,017 B1 | * | 6/2001 | Leason et al. | 463/42 |
| 7,340,718 B2 | | 3/2008 | Szladovics et al. | |
| 7,398,224 B2 | * | 7/2008 | Cooper | 705/7.37 |
| 7,412,402 B2 | * | 8/2008 | Cooper | 705/7.42 |
| 7,434,163 B2 | | 10/2008 | McKellar et al. | |
| 7,444,585 B2 | | 10/2008 | McKellar et al. | |
| 7,702,650 B2 | | 4/2010 | McKellar et al. | |
| 7,703,015 B2 | | 4/2010 | McKellar et al. | |
| 7,799,984 B2 | * | 9/2010 | Salter | 84/477 R |
| 7,996,382 B2 | * | 8/2011 | Dickerson et al. | 707/709 |
| 8,047,848 B2 | * | 11/2011 | Margiotta | 434/107 |

(Continued)

OTHER PUBLICATIONS

Herger, Mario, Oink Oink! Welcome to the SAP Gamificaiton Cup! SAP.com, Jun. 27, 2011.*

(Continued)

*Primary Examiner* — Scott L Jarrett
(74) *Attorney, Agent, or Firm* — Fish & Richardson P.C.

(57) ABSTRACT

Methods, computer-readable media, and systems for gathering gamification data from business applications. Common gamification data that describes a user that accesses a business software environment, and specific gamification data that describes the user and is specific to a particular computer system in the business environment are identified at a user interface of a client device in response to a request from a gamification engine. By executing gamification logic in the user interface, the common gamification data and the specific gamification data are collected at the user interface and provided to the gamification engine. For example, the gamification data can be gathered by monitoring interactions between the user and the client device that is connected to the gamification engine at the user interface, and provided to the gamification engine independent of the business computer system to which the client device is connected.

21 Claims, 17 Drawing Sheets

(56) References Cited

U.S. PATENT DOCUMENTS

| | | | |
|---|---|---|---|
| 8,050,967 B2* | 11/2011 | Bistriceanu et al. | 705/14.19 |
| 8,070,608 B2* | 12/2011 | Uhlir et al. | 463/42 |
| 8,103,953 B2 | 1/2012 | McKellar et al. | |
| 8,147,328 B2* | 4/2012 | Carroll et al. | 463/29 |
| 8,180,666 B2* | 5/2012 | Minert et al. | 705/7.42 |
| 8,210,940 B2* | 7/2012 | Carroll et al. | 463/29 |
| 8,244,567 B2* | 8/2012 | Estill | 705/7.14 |
| 8,342,845 B2* | 1/2013 | Margiotta | 434/107 |
| 8,348,768 B2* | 1/2013 | Auterio et al. | 463/42 |
| 8,388,451 B2* | 3/2013 | Auterio et al. | 463/42 |
| 8,388,452 B2* | 3/2013 | Auterio et al. | 463/42 |
| 8,400,661 B2* | 3/2013 | Grasso et al. | 358/1.15 |
| 8,433,599 B2* | 4/2013 | Hada | 705/7.17 |
| 8,538,006 B1* | 9/2013 | Noble, Jr. | 379/265.06 |
| 8,554,605 B2* | 10/2013 | Oleson et al. | 705/7.41 |
| 2005/0071285 A1 | 3/2005 | Laicher et al. | |
| 2005/0071348 A1 | 3/2005 | Laicher et al. | |
| 2006/0182258 A1* | 8/2006 | Sisselman et al. | 379/265.02 |
| 2007/0112612 A1* | 5/2007 | Dollens | 705/9 |
| 2007/0234306 A1 | 10/2007 | Klinger et al. | |
| 2007/0260511 A1* | 11/2007 | Bender | 705/14 |
| 2008/0033581 A1* | 2/2008 | Doshi et al. | 700/92 |
| 2008/0086505 A1 | 4/2008 | McKellar et al. | |
| 2008/0201231 A1* | 8/2008 | Bistriceanu et al. | 705/14 |
| 2009/0089138 A1* | 4/2009 | Minert et al. | 705/9 |
| 2010/0105525 A1* | 4/2010 | Thukral et al. | 482/8 |
| 2011/0264494 A1* | 10/2011 | Lechowicz | 705/14.12 |
| 2012/0015716 A1* | 1/2012 | Mosites et al. | 463/25 |
| 2012/0156668 A1* | 6/2012 | Zelin | 434/362 |
| 2012/0232971 A1* | 9/2012 | Pabst et al. | 705/14.12 |
| 2012/0259785 A1* | 10/2012 | Ha | 705/304 |
| 2012/0270578 A1* | 10/2012 | Feghali | 455/466 |
| 2012/0270661 A1* | 10/2012 | Smith et al. | 463/42 |
| 2013/0006403 A1* | 1/2013 | Moore et al. | 700/92 |
| 2013/0007155 A1* | 1/2013 | Moore et al. | 709/206 |
| 2013/0013387 A1* | 1/2013 | Groverman | 705/14.27 |
| 2013/0035991 A1* | 2/2013 | Romero et al. | 705/14.1 |
| 2013/0046661 A1* | 2/2013 | Levin | 705/30 |
| 2013/0079128 A1* | 3/2013 | Thomas et al. | 463/30 |
| 2013/0086484 A1* | 4/2013 | Antin et al. | 715/751 |
| 2013/0096981 A1* | 4/2013 | Evans et al. | 705/7.29 |
| 2013/0122472 A1* | 5/2013 | Margiotta | 434/107 |
| 2013/0171593 A1* | 7/2013 | Gorman et al. | 434/219 |
| 2013/0337909 A1* | 12/2013 | Pattison et al. | 463/29 |
| 2014/0058801 A1* | 2/2014 | Deodhar et al. | 705/7.38 |

OTHER PUBLICATIONS

Clark, Tim, The Gamification of SAP Forbes, Mar. 4, 2011.*
Silverman, Rachel Emma, Latest Game Theory: Mixing Work and Play Wall Street Journal Online, Oct. 10, 2011.*
Greenbaum, Josh, Enterprise Gamification Ready to Make the Collaborative Dream Real InformationWeek Online, Jan. 9, 2012.*
David Carr, F., Gamification in Play at Enterprise 2.0 InformationWeek Online, Nov. 3, 2011.*
Hamari, Juho et al., Framework for Designing and Evaluating Game Achievements DIGRA, 2011.*
Rowan, David, Serious Games: Can games change your business and change the world NESTA, Oct. 12, 2010.*
Winning with Gamification: Tips from the Expert's Playbook Bunchmall, Inc., 2011.*
Gamification 101: An Introduction to the User of Game Dynamics to Influence Behavior Bunchball, Inc., Oct. 2012.*
Posada, Mitch, Level-up! your business with Gamification FoundersSpace, Jul. 2011.*
Mehta, Manish et al., Scores, Badges, Leaderboards and Beyon: Gamification and Sustainable Behavior Change Accenture, 2012.*
Ambuj, Nitesh et al., Enterprise Gamification Happiest Minds, Apr. 2012.*
Fu Ya Chiang, The Game of Life: Designing a Gamification System to Increase Current Volunteer Participation and Retention in Volunteer-based Nonprofit Organizations, Trinity University, Jan. 1, 2011.*
Deterding, Sebastian et al., Gamification: Using Game Design Elements in Non-Gaming Contexts CHI 2011 Workshop, May 7-12, 2011.*
Carlson, Lauren, Gamification: The Key to Preventing Support Agent Burnout Software Advice, Feb. 21, 2012.*
Hammarber, Christina, Gamified Helpdesk Concepts May Combat Agent Burnout Lean Workforce Manacement, ICMI, Mar. 1, 2012.*
"*Gamification*," Wikipedia, [online], <http://en.wikipedia.org/w/index.php?title=Gamification&printable=yes>, retrieved Apr. 25, 2012, 7 pages.
U.S. Appl. No. 11/396,302, filed Mar. 31, 2006, Klinger et al.

* cited by examiner

ENTERPRISE GAMIFICATION SYSTEM FOR AWARDING EMPLOYEE PERFORMANCE

TECHNICAL FIELD

The present disclosure relates to software, computer systems, and computer-implemented methods for gamification.

BACKGROUND

Business software environments include business computer systems, each of which includes multiple, inter-connected, computer systems executing computer software applications to perform business operations. A business computer system can be dedicated to a particular aspect of a business, for example, sales, production, marketing, and the like. A business computer system that is dedicated to an aspect can be connected to similar business computer systems that are dedicated to respective other aspects of the business. Such software systems can collectively form a business software environment. A user associated with a particular business computer system, for example, a sales employee using a sales computer system, can access features associated with the particular business computer system that other users not associated with the particular business computer system cannot access. In addition, the user can access features associated with the business software environment that are accessible to all users of all business computer systems that form the environment.

To enhance productivity and efficiency of employees, and to introduce an element of fun at work, a business can employ gamification techniques, for example, by using game design and mechanics to solve problems and engage its employees. For example, gamification techniques can be implemented as incentives to employees of an aspect of a business, for example, to engage in pseudo-competitions. Such techniques can also be implemented to incentivize employees of one aspect of a business, for example, sales, to engage in pseudo-competitions with another aspect of the business, for example, production. In another example, the sales department can be incentivized to engage in a pseudo-competition of achieving a certain target, for example, a sales goal.

In some situations, the gamification techniques can be incorporated into or included as part of the business software environment, and implemented using one or more gamification computer systems. To do so, data describing users of the business software environment may need to be gathered. In some situations, significant changes to the infrastructure of the business software environment may be needed to incorporate the data gathering techniques and the gamification techniques.

SUMMARY

The present disclosure involves systems, software, and computer-implemented methods for gathering gamification data from business software environments.

In general, one innovative aspect of the subject matter described here can be implemented as a computer-implemented method. It is determined that a user has accessed a business software environment including multiple computer systems using a client device that is connected to the business software environment. Each computer system implements respective computer software applications to perform respective operations. In response to determining that the user has accessed the business software environment, a user interface is presented at the client device. Common gamification data that describes the user is identified at the user interface in response to receiving a request for the common gamification data from a gamification engine connected to the business software environment. It is determined at the user interface that the user has accessed a particular computer system of the multiple computer systems. Specific gamification data that describes the user and that is specific to gamification in the particular computer system is identified at the user interface in response to receiving a request for the specific gamification data from the gamification engine. The common gamification data and the specific gamification data are provided to the gamification engine in response to receiving the requests.

This, and other aspects, can include one or more of the following features. Operations performed at the user interface can be monitored. The operations can include one or more of operations performed by the user through the user interface, operations implemented by the business software environment through the user interface, or operations implemented by the particular computer system through the user interface. Identifying the common gamification data and the specific gamification data at the user interface can include identifying the common gamification data and the specific gamification data based on monitoring the operations. Determining that the user has accessed the business software environment can include authenticating the user as an authorized user of the business software environment. The common gamification data can include authentication data that the user provides to be authenticated as the authorized user. Data that the user is authorized to access can be presented in the user interface. At least a portion of the data that the user is authorized to access can be included in the common gamification data. The data that the user is authorized to access can include a navigation structure assigned to an account on the multiple computer systems that is associated with the user. Determining that the user has accessed the particular computer system can include displaying the navigation structure in the user interface, and determining that the user has selected a portion of the navigation structure that is specific to the particular computer system. The specific gamification data can include gamification data that the user provides to or receives through the user interface, gamification data received from a computer software framework provided by the particular system in response to executing instructions to present the user interface, and gamification data received from the computer system based on interactions between the user and the particular computer system. The gamification engine can determine a performance measure based on the common gamification data and the specification data. The gamification performance measure can be provided to the user through the user interface. The common gamification data and the specific gamification data can be identified periodically starting from a time that the user accesses the business software environment and stopping at a time when the user ceases to access the particular computer system. In response to determining that the user has accessed the business environment using the client device, a gamification logic can be executed in the user interface to gather the common gamification data and the specific gamification data.

Another innovative aspect of the subject matter described here can be implemented as a non-transitory computer-readable medium executing computer software instructions executable by data processing apparatus to perform operations described here. A further innovative aspect of the subject matter described here can be implemented as a system that includes one or more data processing apparatus and a non-transitory computer-readable medium storing computer software instructions executable by the one or more data processing apparatus to perform the operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
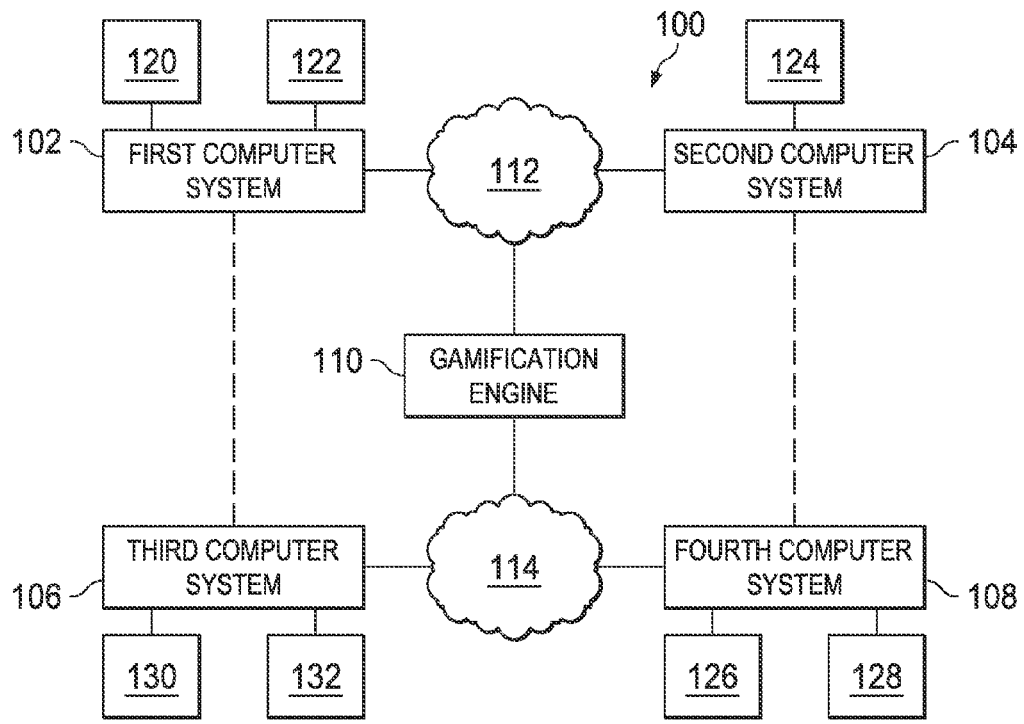
FIG. 1 illustrates an example business software environment for implementing various features of business computer systems that includes a gamification engine.

This disclosure describes computer-implemented methods, computer-readable media, and computer systems for gathering gamification data from multiple computer systems in a business software environment, and providing the gathered gamification data to a gamification engine (described below) that implements gamification in the business software environment. The gathered gamification data describes users of the business software environment, for example, users who are authorized to use the computer systems in the business software environment. The gamification engine can gather the gamification data describing the users through the user interface (UI) clients infrastructure implemented by each of the multiple computer systems in the business software environment. In some implementations, a user can access the business software environment, particularly, a computer system in the environment, using a client device. When the user does so, the business software environment can present a user interface in the client device. Gamification logic, described below, can be executed in the user interface through which the gamification data can be collected and provided to the gamification engine.

For example, with the user's consent, the gamification engine can monitor and track a user's interactions with a UI provided by a computer system in the business software environment that the user is authorized to access. From all such users, the gamification engine can extract relevant data describing the user and identify gamification data, i.e., data that is of interest for gamification. Through users' usage of UIs, the gamification engine can extract, for example, by capturing and tagging, gamification data to measure gamification relevant key performance indicators (KPIs). By processing the gathered data, the gamification engine can provide a gamification UI to users who participate in gamification to allow the users to self-monitor their performances.

Implementing the techniques described here may provide one or more of the following potential advantages. The gamification engine can be connected to the business software environment and configured to use the existing UI infrastructure implemented by the multiple computer systems of the business software environment. For example, the gamification engine can be configured to gather data describing the users from user interfaces that are displayed on the users' respective client devices by the business computer systems. This can minimize or negate the need to modify the existing business software environment to enable integrating the gamification engine, thereby enabling a non-disruptive integration of gamification with the business software environment. For example, the gamification engine can gather data about the users without being connected to or while maintaining a minimal connection to the business computer systems that the users access.

Further, by gathering gamification data as described below, the gamification engine can be integrated centrally at a point through which a substantial number of users of the business software environment will pass to access the multiple computer systems of the environment. Such a central approach, in which the gamification engine uses (or re-uses) an existing UI client infrastructure, can enable gamification in business software and accelerate the implementation of gamification. The central approach can also enable gamification across multiple systems, technologies, and applications without a need to modify the existing applications.

The gamification data gathered by implementing the techniques described here can enable implementing present and future gamification ideas in the business software environment. Such ideas can be maintained and distributed centrally, thereby decreasing or potentially eliminating distribution issues. For a gamification participant (i.e., a user of one of the computer systems), such an implementation of gamification allows the participant to decide whether or not she wants to participate, as an initial matter, and, subsequently, to obtain updates on her achievements, KPIs, other relevant data, or combinations of them.

Furthermore, by providing gathered data describing users to the gamification engine using the techniques described here, the business software environment can be enabled to implement a gamification process with which efficiency or effectiveness (or both) of users of the business computer systems in the environment, for example, in their respective daily work, can be determined. Responsively, gamification techniques can be implemented to increase productivity. From the perspective of the users, consenting to the gathering of data and participating in gamification can introduce an element of fun at work thereby increasing a respective user's interest in working and ultimately resulting in an increase in productivity or efficiency (or both). By offering gamification services that can non-disruptively be integrated with business software environments, the gamification services can attract business software environments to implement gamification processes.

In the example implementations described below, the gamification data that is collected and provided to the gamification engine is described as including two types—common gamification data that describes users that access the business software environment, and specific gamification data that describes users that access a particular computer system in the environment and that is specific to the particular computer system. It will be understood that the common gamification data and the specific gamification data can include overlapping data. For example, an item of specific gamification data that is specific to the particular computer system can be the same for multiple computer systems, and consequently can overlap with an item of common gamification data. Further, in the example implementations described below, the common gamification data and the specific gamification data are described as being received in response to receiving a first request and a second request, respectively, from the gamification engine. The first request and the second request can be part of the same request. Further, the requests can be received in any sequence from the gamification, and, in some examples, can be received in parallel.

FIG. 1 illustrates an example business software environment 100 for implementing various features of business computer systems that includes a gamification engine. The business software environment 100 includes multiple interconnected business computer systems—for example, a first computer system 102, a second computer system 104, a third computer system 106, a fourth computer system 108, and the like—each of which implements at least a portion of business software. Each business computer system is connected to one or more client devices. For example, the first computer system 102 is connected to client devices 120 and 122, the second computer system 104 is connected to a client 124, the third computer system is connected to clients 130 and 132, the fourth computer system is connected to clients 126 and 128. Each client device is operated by users who are members—for example, authorized users—of respective business computer systems, and is potentially a participant in the gamification.

Gamification in the business software environment is implemented by a gamification engine 110. By implementing the techniques described below, the gamification engine 110 can gather data describing the users and use the gathered data for gamification. The multiple business computer systems and the gamification engine 110 are connected by one or more networks—for example, a first network 112, a second network 114—such as the Internet. In addition, each client is connected to its respective business computer system through one or more networks (not shown) such as the Internet.

As described below, the gamification engine 110 can gather data describing the users by re-using the existing UI client infrastructure implemented by each business computer system in the business software environment 100. In some implementations, the existing UI infrastructure can provide options, such as, an option to launch business software applications implemented by the business computer systems. The gamification engine 110 can be non-disruptively integrated with the UI client infrastructure. Implementations of the gamification engine 110 to gather data describing the users is described below with reference to one business computer system (for example, the first computer system 102) that is connected to multiple client devices. The gamification engine 110 can extract relevant user information and identify gamification related content, extract relevant gamification information and measure gamification performance against KPIs, and perform as a UI-centric engine.

The data gathering techniques are described below from the perspective of a user operating a client device connected to the first business computer system 102, but are applicable to multiple users operating multiple client devices connected to the other business computer systems in the business software environment 100. Further, the data gathering techniques are described as being implemented by the business computer systems to which the client devices are connected, but can be implemented, in the alternative or in addition, by the gamification engine 110 or by other computer systems connected to the business software environment 100 (not shown).

Figure 2:
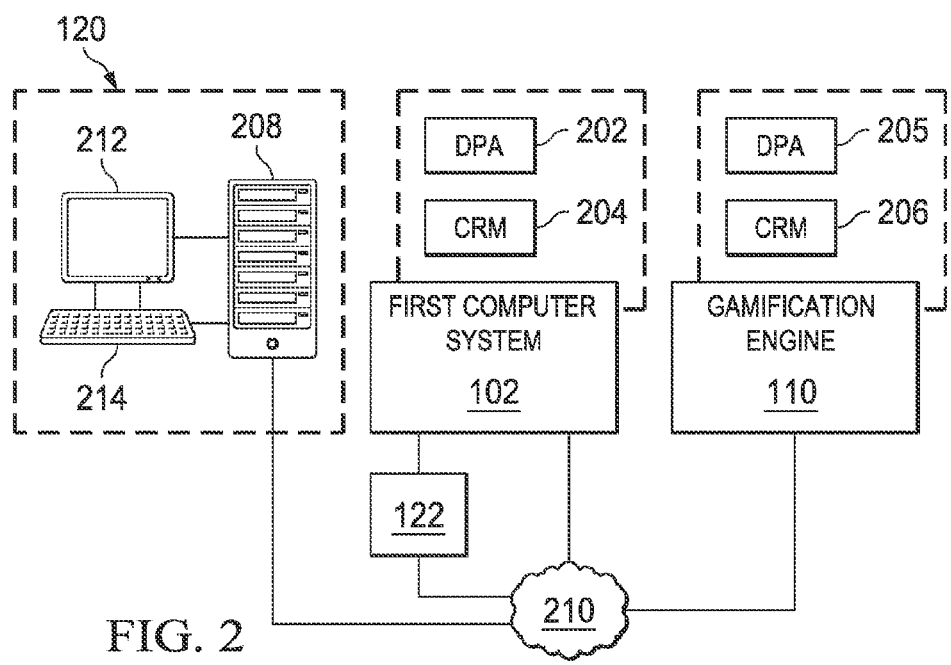
FIG. 2 illustrates example client computer systems that are connected to a business computer system.

FIG. 2 illustrates example client computer systems (for example, a first client 120, a second client 122, and the like) that are connected to a business computer system (for example, the first computer system 102 through one or more networks 210 (for example, the Internet). The first computer system 102 is further connected to the gamification engine 110 through one or more networks 112 (for example, the Internet). The first computer system 102 includes data processing apparatus 202 that can execute computer software instructions stored on a computer-readable medium 204 to perform operations, for example, operations to provide a business software service, for example, sales. The gamification engine 110 similarly includes data processing apparatus 205 that can execute computer software instructions stored on a computer-readable medium 206 to perform operations including gathering data describing users and implementing gamification.

The client can be any computer system, for example, a desktop computer, a laptop computer, a personal digital assistant, a tablet computer, a mobile device, and the like. In some implementations, the first client 120 can include a computer 208 (for example, a central processing unit) connected to a display device 212 and input devices 214, for example, keyboard, mouse, stylus, touch screen, and the like. The first client 120 can implement business software applications by executing computer software instructions to perform operations including displaying user interfaces in the display device 212. A user of the first client 120 can provide data to the UI using the input devices 214. The gamification engine 110 can execute gamification logic in the UI that causes UI to gather all or portions of the data provided by the user of the first client 120 and to transmit the gathered portions to the gamification engine 110 for use in gamification. In this manner, the gamification engine 110 can obtain gamification data directly from the client device based on operations performed at the client device. The operations performed at the client device can include one or more of operations performed by the user through the user interface, operations implemented by the business software environment through the user interface, or operations implemented by the particular computer system through the user interface.

As described above, the first business computer system 102 is part of and connected to a business software environment 100. Thus, an authorized user of the first client 120 can access features of both the business software environment 100 and the first business computer system 102 itself. For example, the authorized user can access UI provided by the business software environment 100 to log in to the environment, as a first step, and then access UI provided by the first business computer system 102 to log in to the system, as a second step. The UI provided by the business software environment 100 represents a single point of entry common to all users and through which all users must pass to access a business computer system in the environment 100. Having successfully passed through this single point of entry, the authorized user can access additional UI features offered by the first business computer system 102.

For example, the authorized user can access sales features of the UI offered by a sales computer system to place orders and conduct sales-related transactions. However, the authorized user may not have access to aspects of other business computer systems, for example, the marketing computer system. Consequently, the data that describes a user can be divided into two categories—common gamification data that describes the user as a user of the business software environment 100, and specific gamification data that describes the user as a user of a business computer system and is specific to gamification in the particular computer system. As described below, the gamification engine 110 can gather both common gamification data and specific gamification data that describe a user.

In some implementations, the first business computer system 102 can determine that a user has accessed the business software environment 100 through the first business computer system 102. For example, the user can launch a business software application installed on the first client device 120, which can grant the user access to the business software environment 100. When the user has accessed the business software environment 100, the gamification engine 110 can provide a request to the first business computer system 102 for common gamification data describing the user. The common gamification data can include authentication data that the user provides to be authenticated as an authorized user of the business software environment 100.

The first business computer system 102 can present a user interface that is common to the multiple business computer systems in the business software environment 100 in response to determining that the user has accessed the business software environment. For example, in the user interface, the first business computer system 102 can display features common to all business computer systems in the environment 100 that all users of the environment 100 are authorized to access. In response to the request from the gamification engine 110 for the common gamification data, the first business computer system 102 can include at least a portion of the data that the user is authorized to access. For example, in the request, the gamification engine 110 can specify a time of access, a location of access (for example, from the office client device, a mobile device, and the like). Common gamification data that describes the user and that is common to all computer systems can be, for example, the client type that the user is using (such as, a desktop application, an Internet interface, a mobile device), the user name, language used, user's organization, and the user's role in the organization. In response, the first business computer system 102 can monitor the data specified in the request, and provide the requested data to the gamification engine 110.

In some implementations, the user of the first client device 120 can access a particular computer system, namely, the first business computer system 102. As described below, the user can do so by selecting one or more navigational features displayed in the UI after the UI has access the business software environment 100. In this situation, the gamification engine 110 can provide another request for specific gamification data that describes the user and that is specific to the first business computer system 102. The first business computer system 102 can identify the specific gamification data, which can include gamification data that the user provides to or receives through UIs displayed on the display device 212 by the first business computer system 102. The specific gamification data can also include gamification data received from a computer software framework provided by the first business computer system 102 in response to executing the instructions to present the UI in the display device 212. The specific gamification data can also include gamification data received from the computer system based on interactions between the user and the first business computer system 102. Additional examples of specific gamification data are described below.

The first business computer system 102 can provide the common gamification data and the specific gamification data to the gamification engine 110 in response to receiving the requests. In some implementations, the gamification engine 110 can request the common gamification data in a first request and the specific gamification data in a second request, or can request the common and specific gamification data together in one request. The gamification engine 110 can provide the first and second requests in any sequence. The gamification engine 110 can determine a performance measured based on the common gamification data and the specific gamification data, and can provide the gamification performance measure to the user, for example, by displaying the performance measure in a UI on the display device 212 as described below. In some implementations, first business computer system 102 can identify the common gamification data and the specific gamification data periodically starting from a time that the user accesses the business software environment and stopping at a time when the user ceases to access the first business computer system 102.

Figure 3:
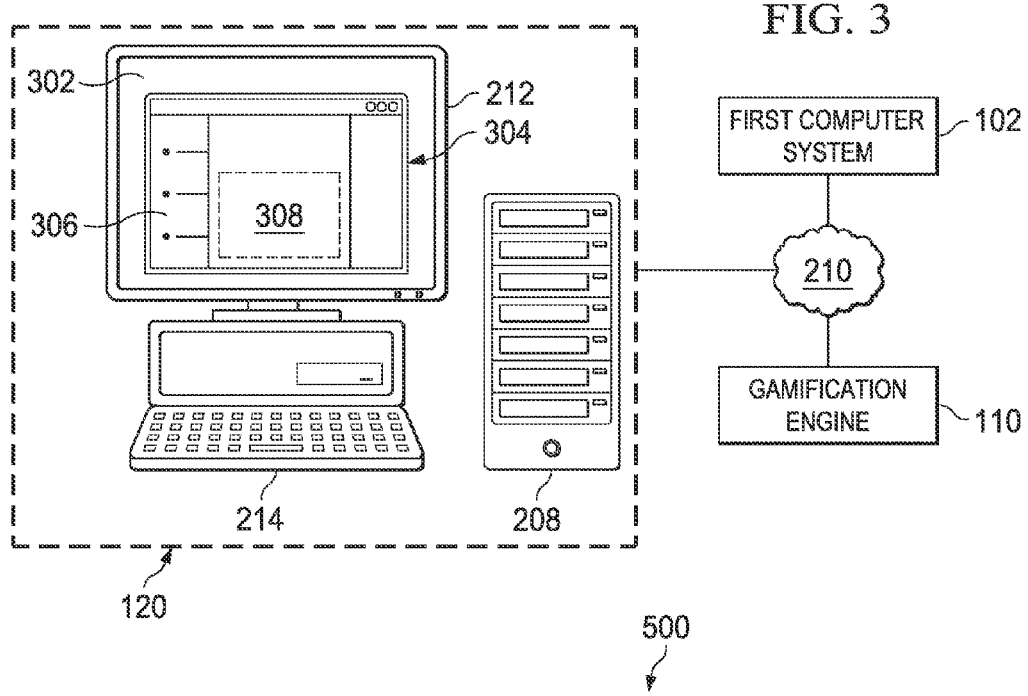
FIG. 3 illustrates an example client computer system presenting a user interface using a business computer system which is gathering gamification data.

FIG. 3 illustrates an example client computer system, for example, the first client device 120, presenting a user interface 302 with which the first business computer system 102 gathers data. In alternative implementations, the gamification engine 110 rather than the first business computer system 102 can present the user interface 302 to gather data including the common gamification data and the specific gamification data. A first stage of gathering gamification data can include extraction of relevant user information and identification of gamification relevant content. Prior to gathering data describing a user of the first client device 120, it can be determined if the user has provided consent to participate in gamification and to collect data describing the user. If the user has not provided consent, then the user can be provided with options for participating or not participating in gamification. If the user declines to participate, then data describing this user may not be gathered.

Assuming that the user has granted consent, then common gamification data and specific gamification data describing the user can be collected as described below. When the user launches a business software application associated with the first business computer system 102, the system 102 (or the gamification engine 110) can display a UI 302 in the display device 212 connected to the first client device 120. Because the user has granted consent to participate in gamification, the first client device 120 can gather gamification data describing the user. To do so, in some implementations, the user interface 302 can implement gamification logic 308, which can include computer software instructions (for example, encoded in the user interface 302) and executable by the computer 208 of the first client device 120. The gamification logic 308 can be encoded in the user interface 302 either by the first business computer system 102 or by the gamification engine 110, or by both. By executing the gamification logic 308, the first client device 120 can determine features of the business software environment 100 and of the system 102 that the user is authorized to access, and identify gamification data from the features that can be used to determine the user's KPIs.

For example, the user starts a UI client 304 associated with the business software environment causing the first client device 120 to initiate a log-in operation by transmitting a request to the first business computer software system 102, and to request navigation structures assigned to the user's account. If the first business computer system 102 authenticates the user, then the system 102 can provide a navigation structure 306, for example, a navigation tree. At this stage, the gamification logic 308 can gather almost everything that the user can launch using the UI client 304 and the navigation structure 306 as input into the gamification process.

The UI client 304 requests a gamification mapping from a repository that stores portions of the features shown in the UI client 304 that are gamification enabled, i.e., gatherable for use in gamification. The features include both the common gamification data, i.e., data describing the user of the business software environment 100 in general, and specific gamification data, i.e., data describing the user of the first business computer system 102 in specific. The UI client 304 can transmit a request for the gamification enabled features to the gamification engine 110 over the network 210. The gamification engine 110 can retrieve the features from storage and provide the retrieved features to the UI client 304 in response. The gamification relevant data, for example, configuration data, can be stored in any format, for example, either as part of the gamification logic 308 in the UI client 304 or as part of the gamification engine 110 from where it is shared with all UI clients or in combinations of them. In some implementations, such gamification configuration data can be stored in a database connected to the gamification engine 110. The gamification configuration features can include both the common gamification data and the specific gamification data. Once the UI client 304 receives the features, the UI client 304 can monitor, track, and gather data associated with the features. The UI client 304 can periodically transmit the gathered data, which includes common gamification data and specific gamification data, to the gamification engine 110. The user can work with the UI client 304 as usual, for example, by navigating the navigation structures 306 and launching one or more applications.

A second stage of gathering gamification data can include extraction of relevant gamification data and measuring of the gamification KPIs. To determine KPIs of a user that can be measured, the gamification engine 110 can initially define data describing the user that can be captured. As described below, the gamification logic 308 can extract data from different channels, and present the data to the gamification engine 110, which can present gamification performance measures to the user through the UI 302. For example, the gamification logic 308 can gather data directly from the UI client 304. The gamification logic 308 can gather gamification data including operations performed by the user—for example, "a search was used," "a system was successfully added," "a side panel functionality was leveraged," and the like. In addition, the gamification logic 308 can also monitor and track navigation activities such as one or more specific business software applications that the user launches.

The gamification logic 308 can gather gamification data from the business software application that the user of the first client device 120 has launched. Using the software framework of the business software application, the gamification logic 308 can monitor and track activity on the application. By doing so, the gamification logic 308 can capture specific UI fields and elements of the business software application UI. The gamification logic 308 can transmit the gathered data to the gamification engine 110, either periodically or upon gathering all data or upon an occurrence of an event (for example, a termination of a session between the first client device 120 and the first business computer system 102). By tracking and gathering gamification data as described here, the gamification engine 110 can use the business software application to track gamification relevant information without modifying the business software application, thereby minimizing risk and expense. In some situations, the business software application can provide gamification data including "a quantity of sales orders created," "a quantity of invoices viewed," and the like. In addition, the gamification engine 110 can inform the user of the user's current state of achievements or a list of achievements on which the user can work (or both). For example, the gamification engine 110 can display the user's performance measure determined based on gathered gamification data in the UI 302.

Figure 4A:
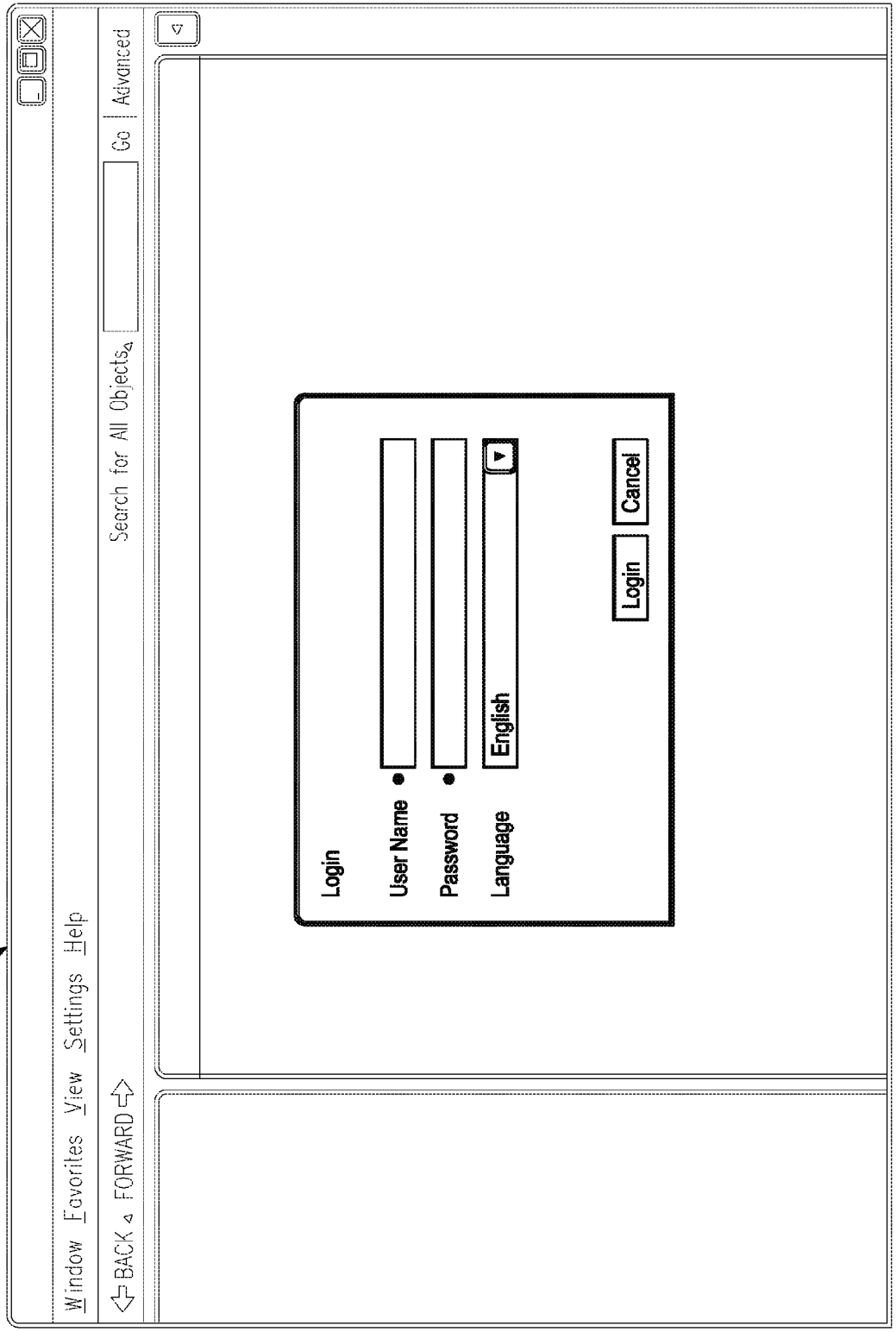
FIGS. 4A-4O illustrate example user interfaces from which the gamification engine can gather data about a user of a sales software system.
Figure 4B:
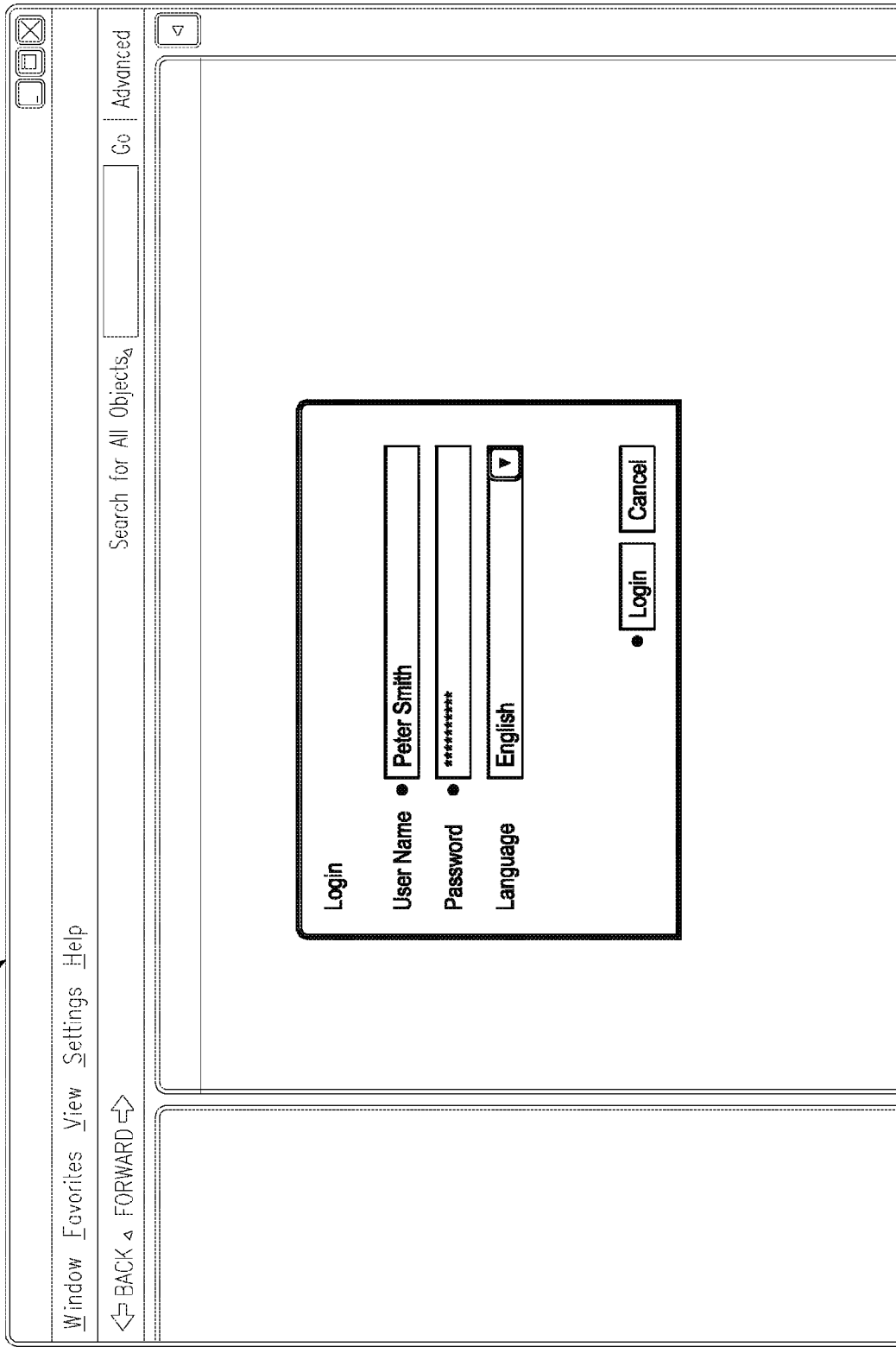
Figure 4C:
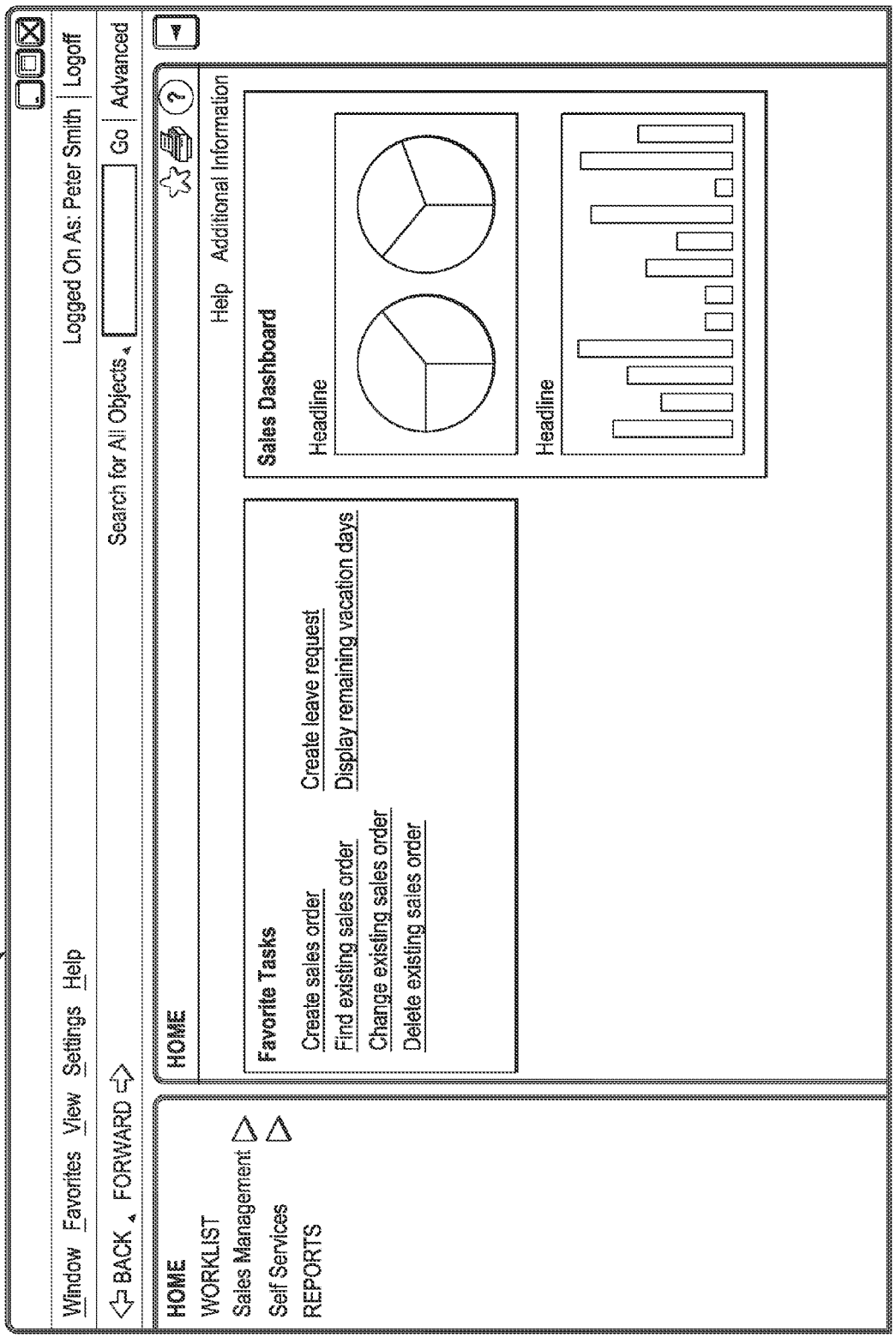
Figure 4D:
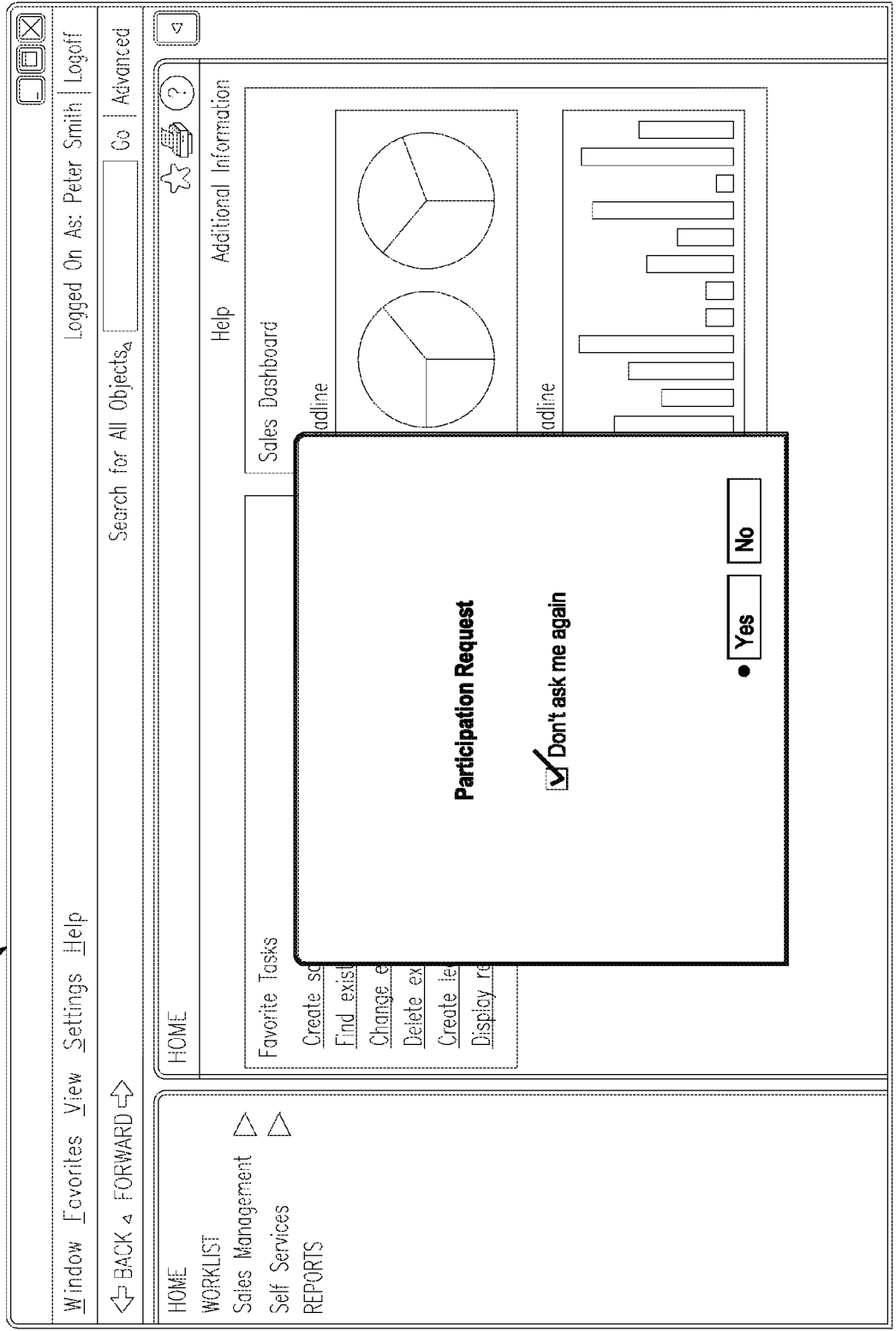
Figure 4E:
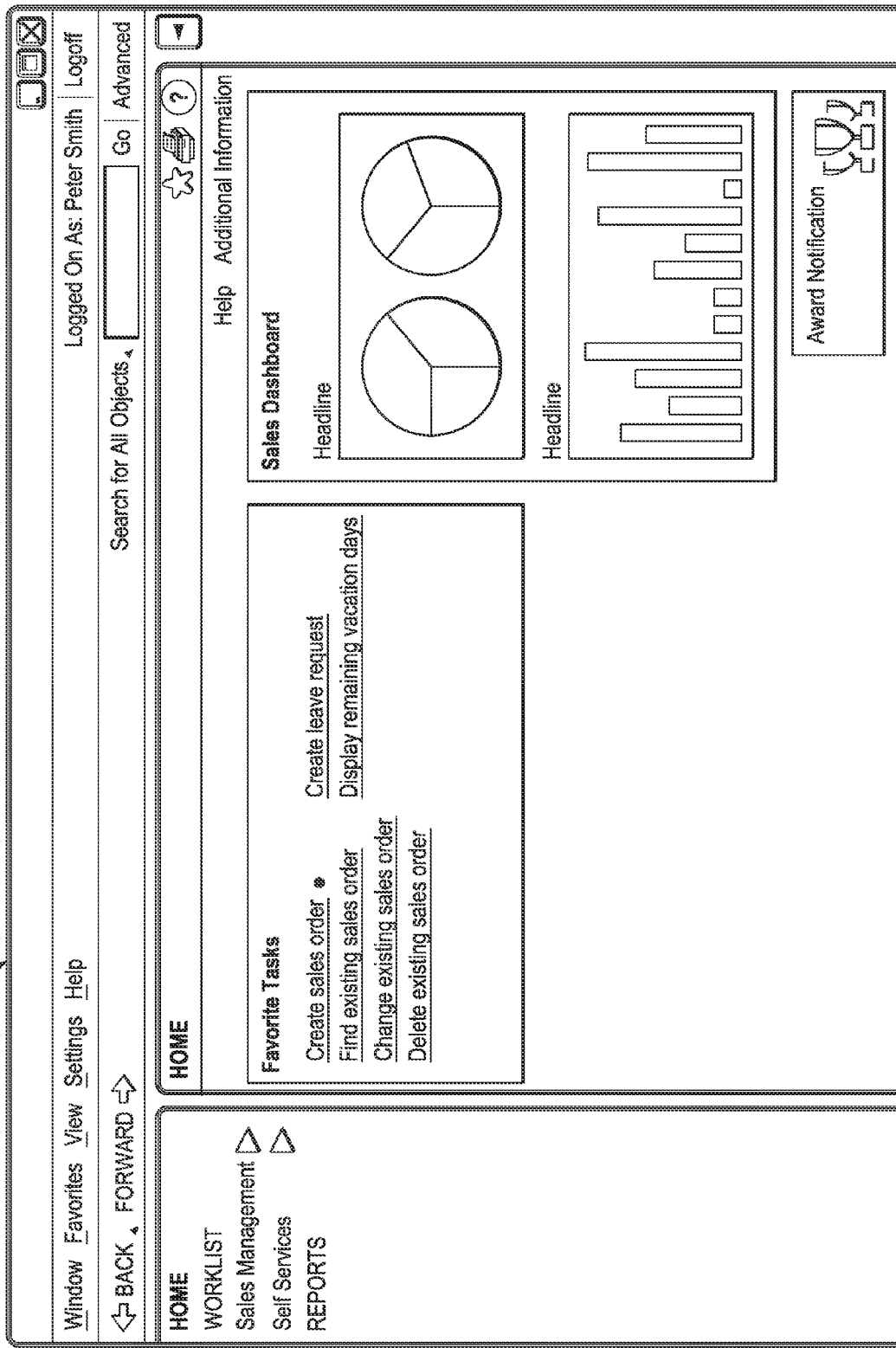
Figure 4F:
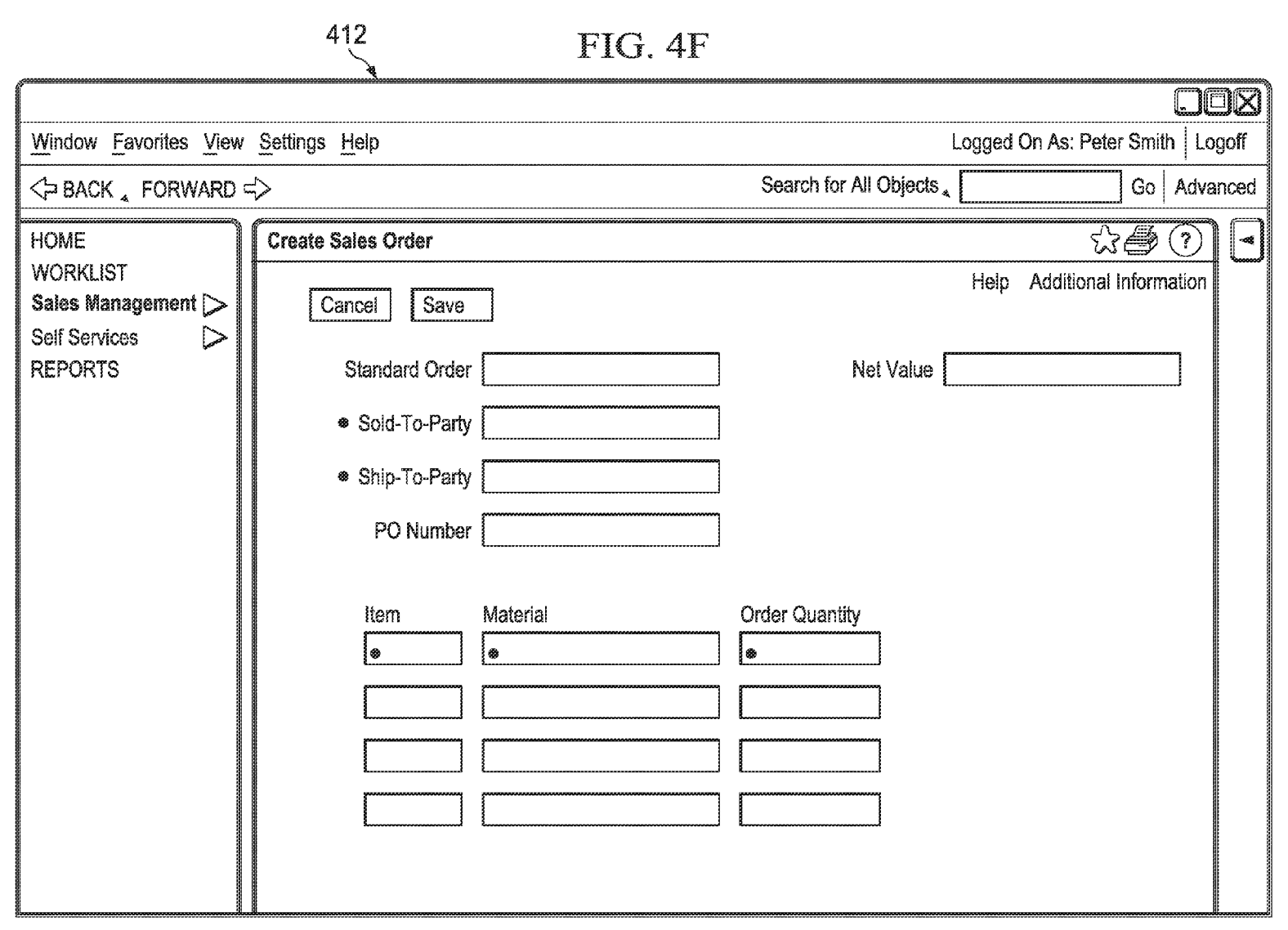
Figure 4G:
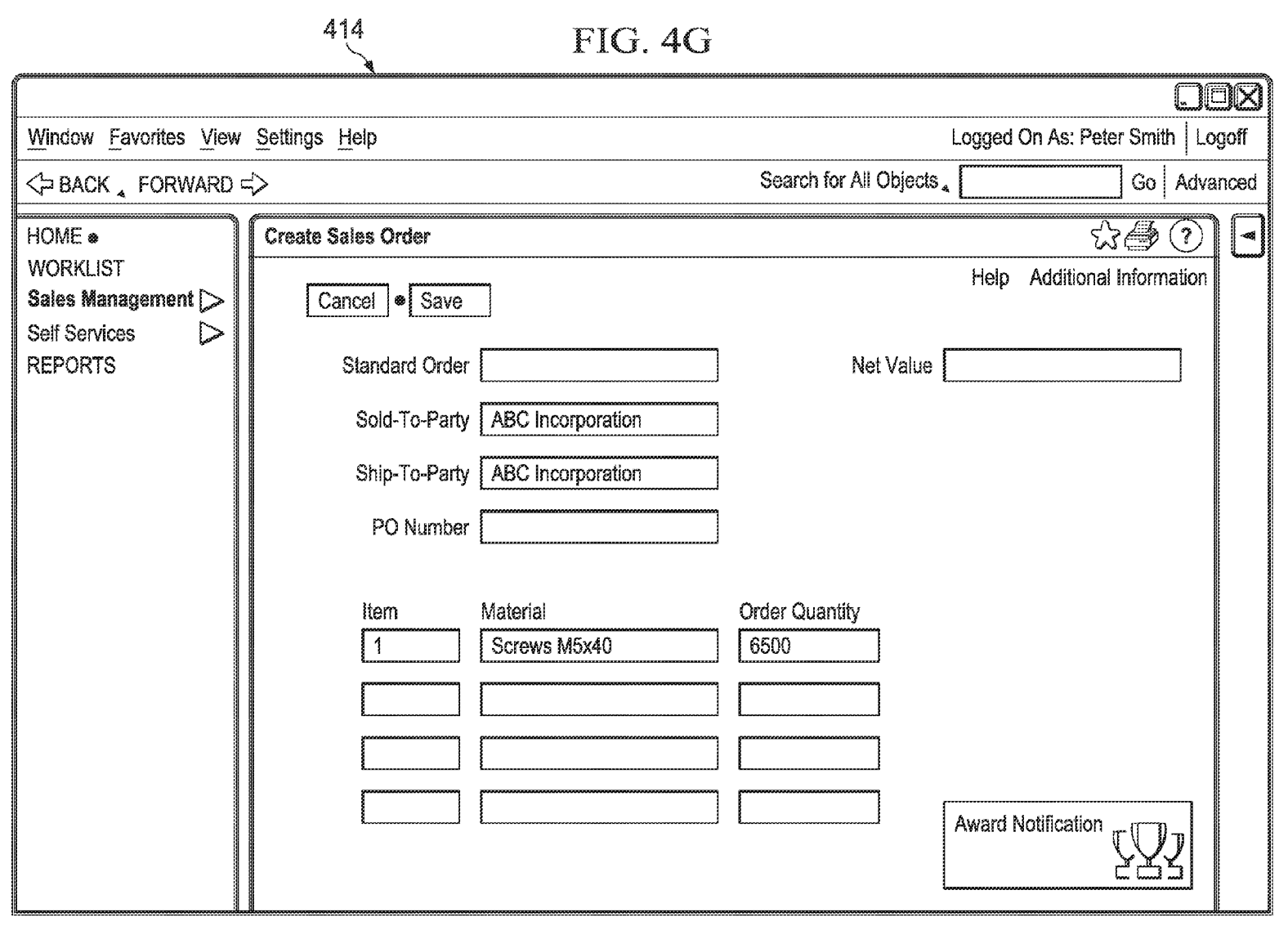
Figure 4H:
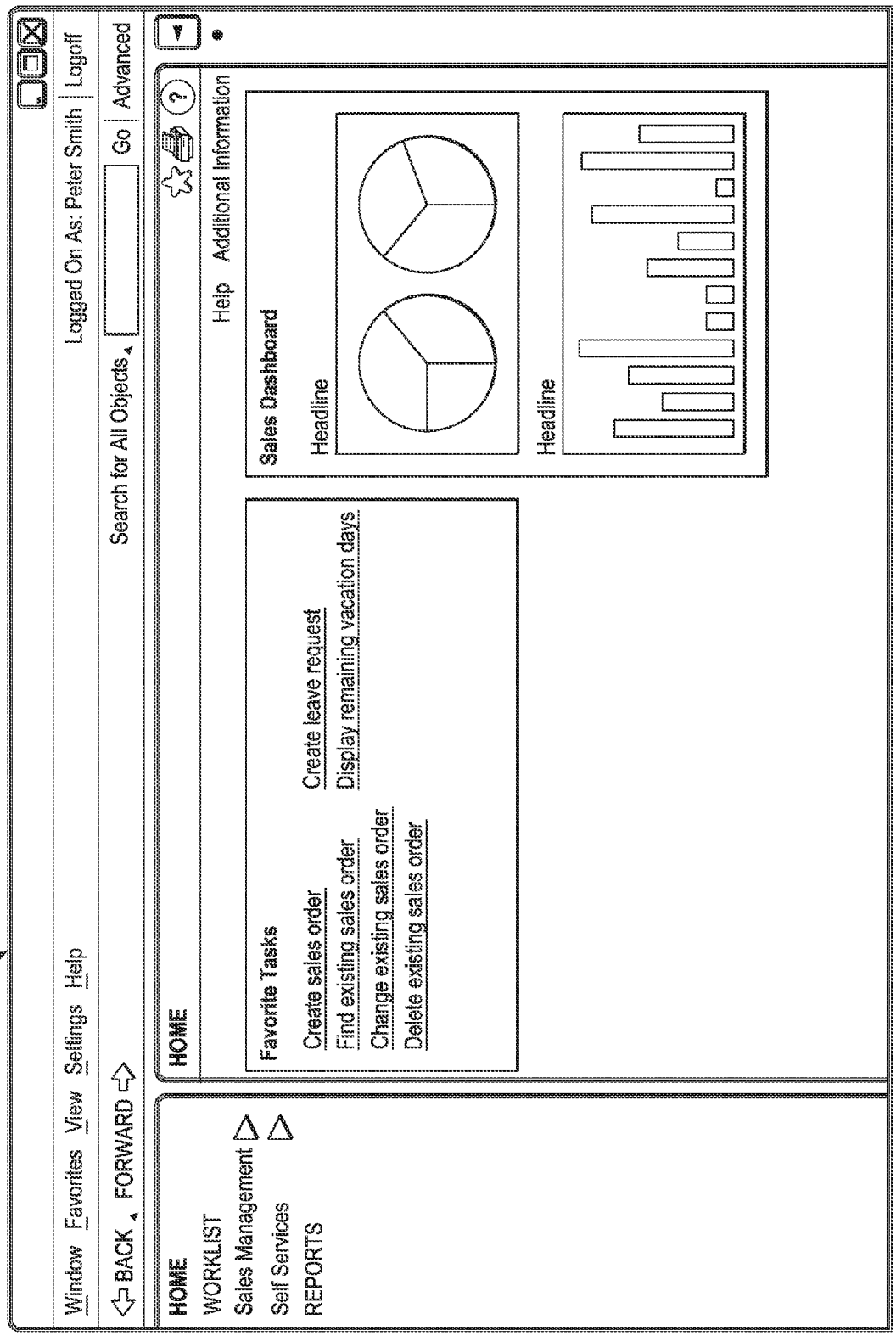
Figure 4I:
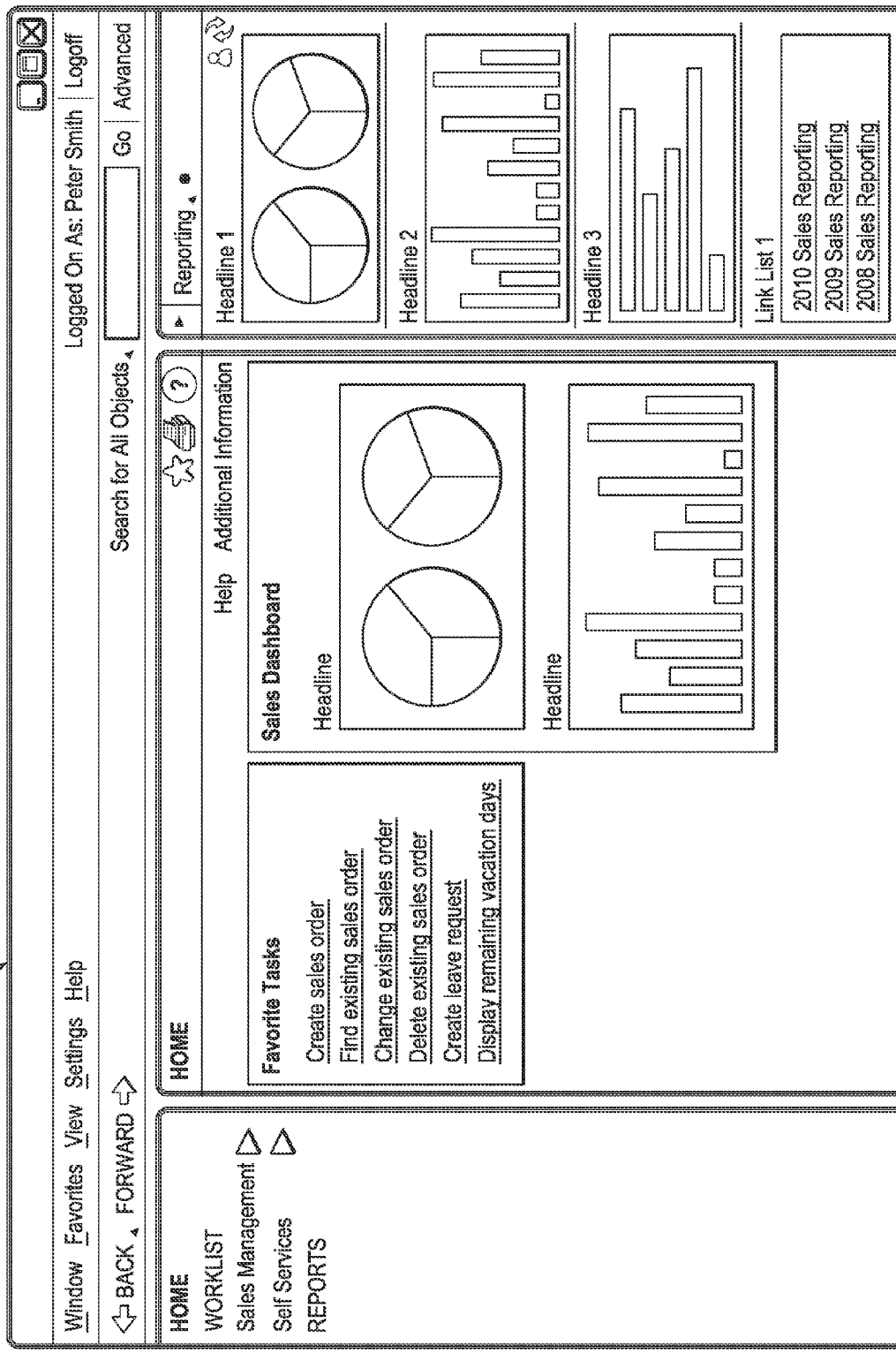
Figure 4J:
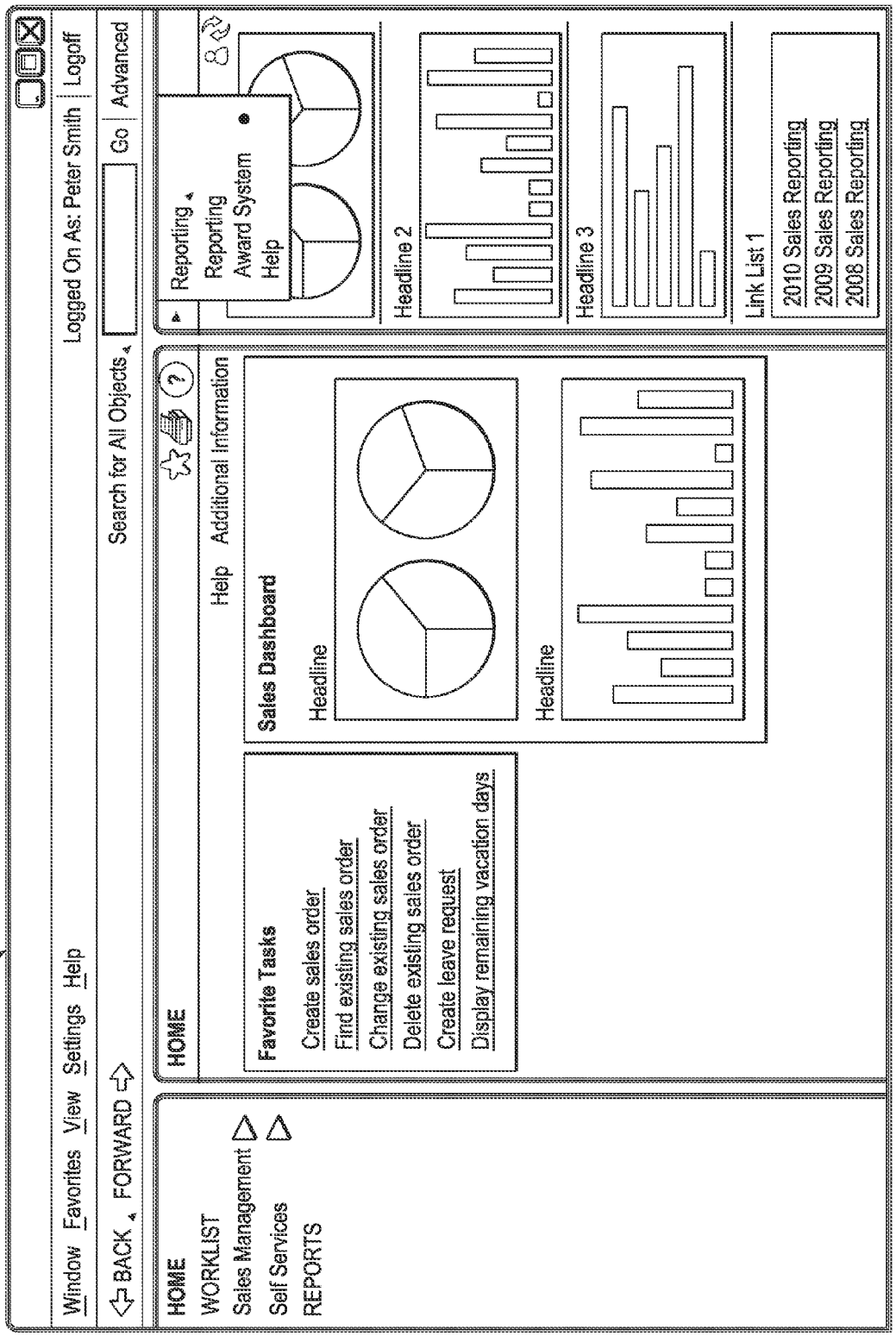
Figure 4K:
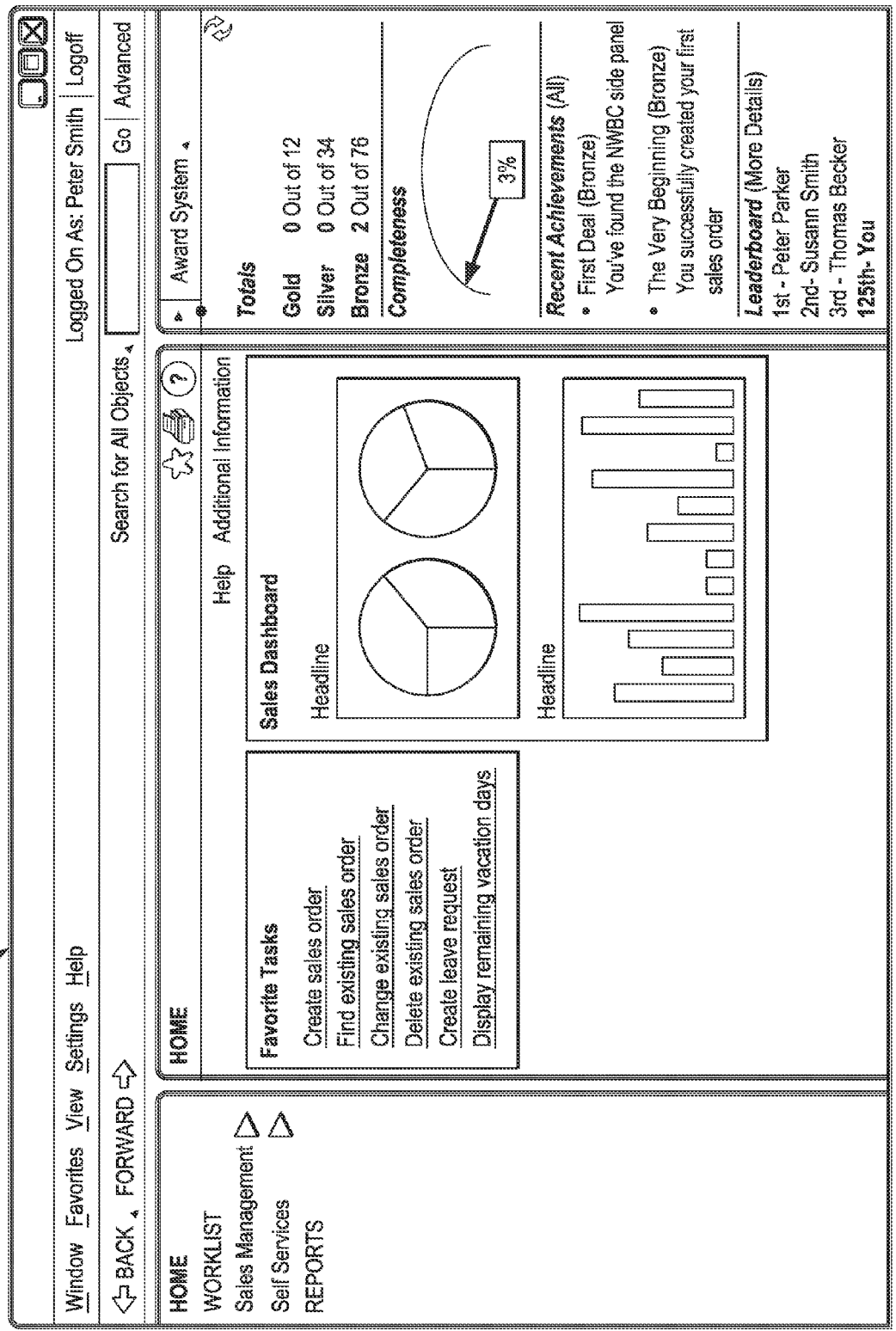
Figure 4L:
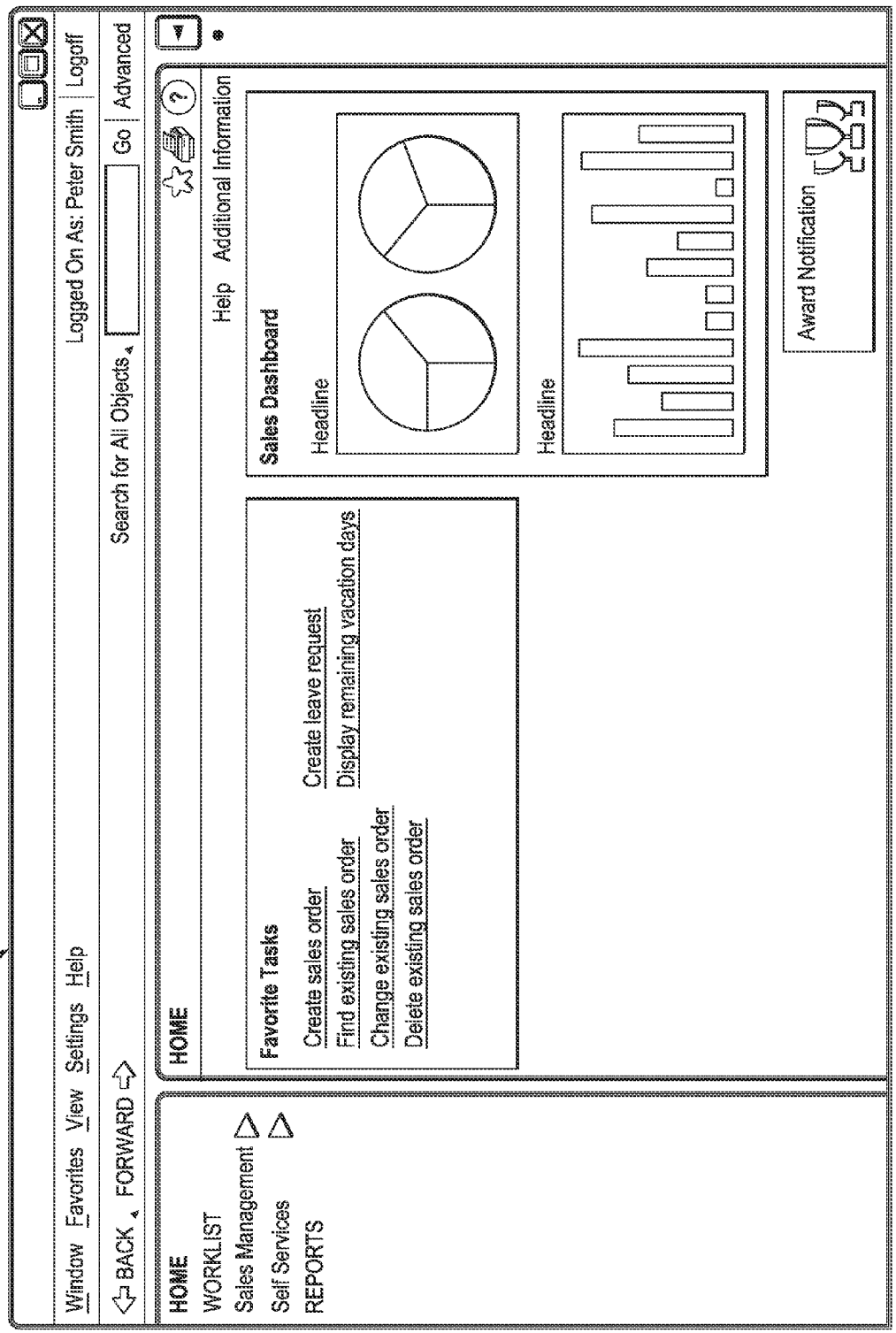
Figure 4M:
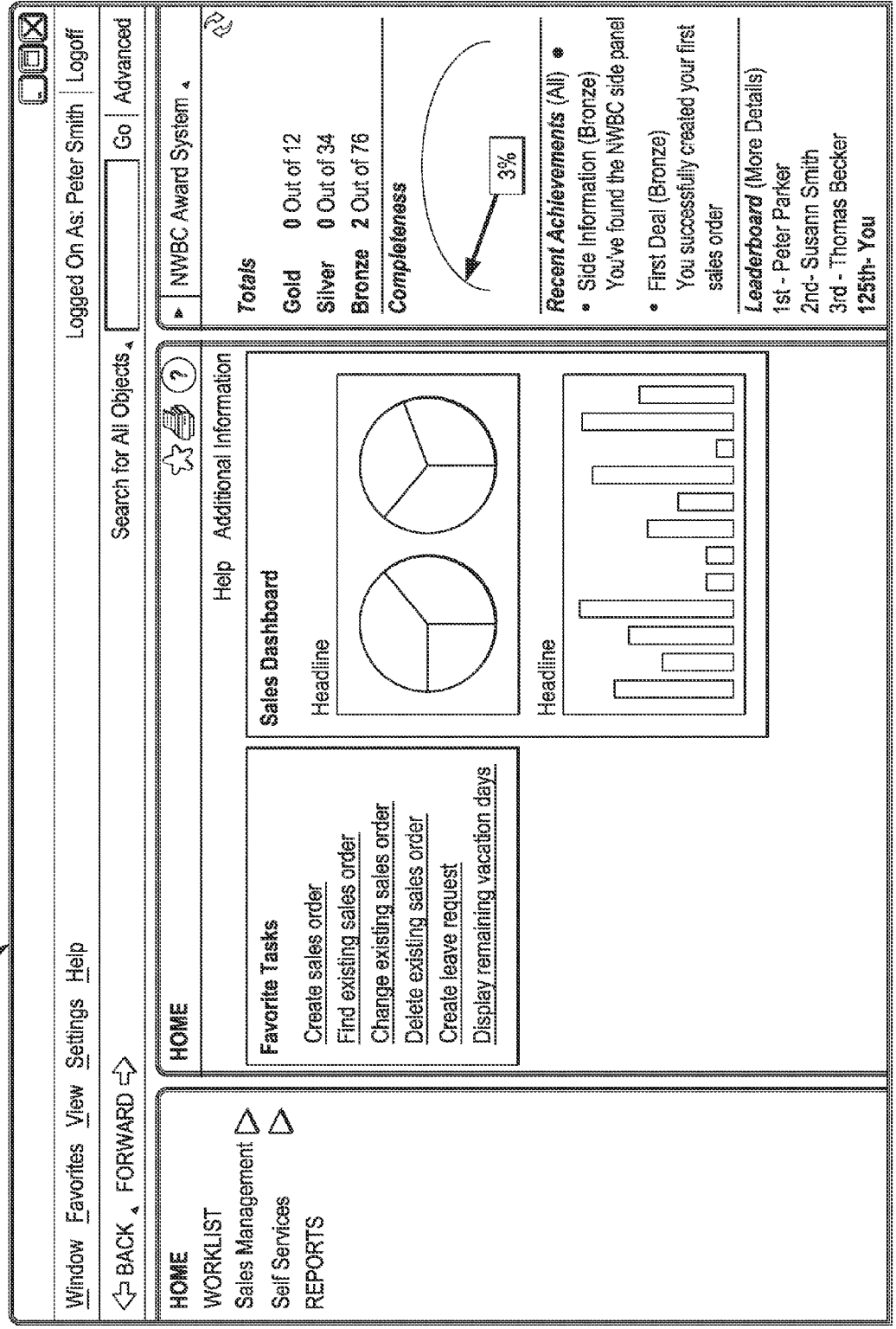
Figure 4N:
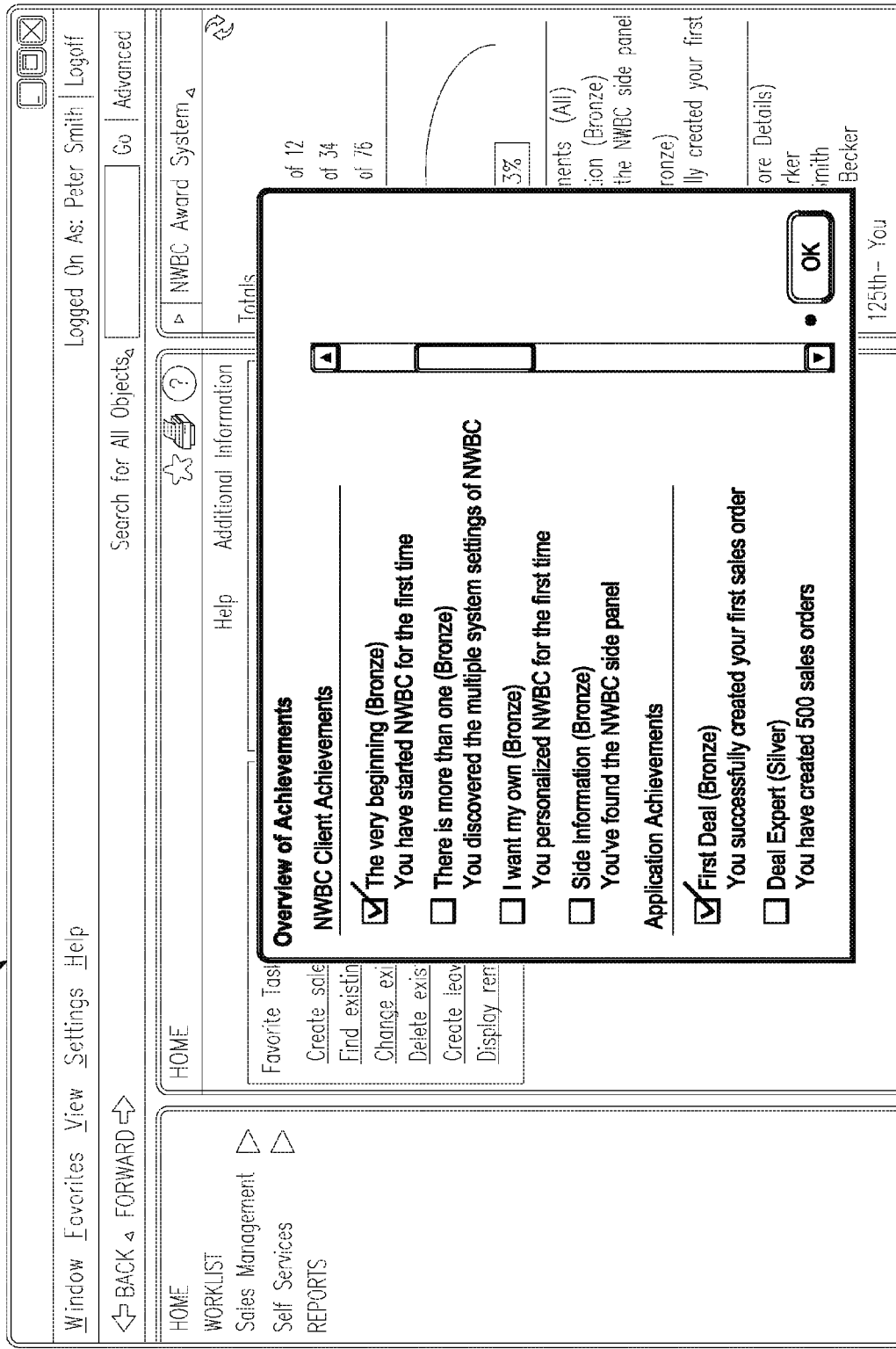
Figure 4O:
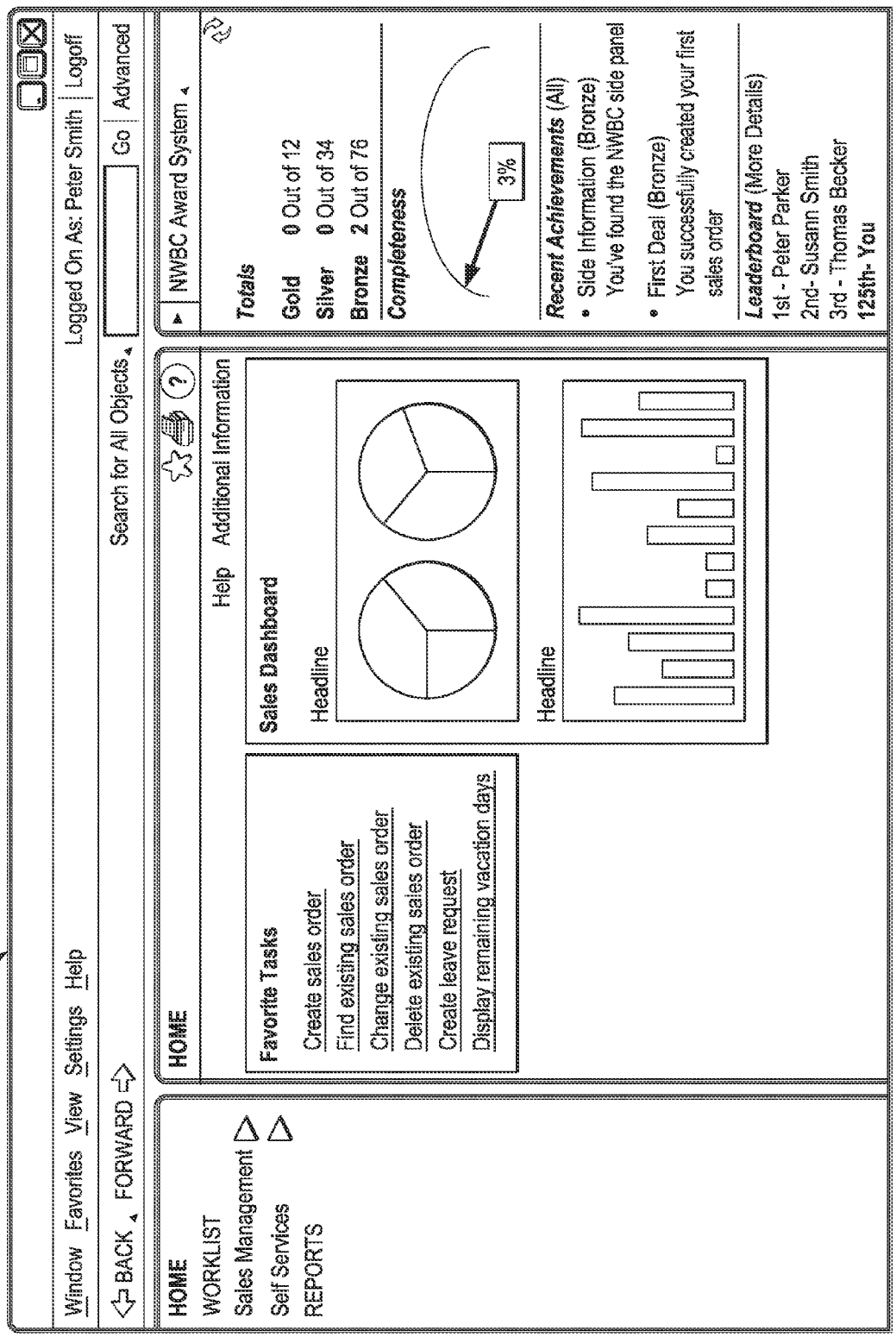

FIGS. 4A-4O illustrate example user interfaces from which the gamification engine can gather data about a user of a sales software system. The gamification logic 308 described with reference to FIG. 3 above can be implemented in each of the example user interfaces shown in FIGS. 4A-4O. Alternatively, for example, the gamification logic 308 can be implemented once in UI client 304, which can then enable the gamification logic 308 to extract relevant gamification data from each of the user interfaces shown in FIGS. 4A-4O. When the user of the client device, for example, the client device 208, launches a business software application to connect to the business software environment 100, the environment 100 can display a UI 402 in the display device 212 (FIG. 4A). The UI 402 can be a log-in UI requesting the user to enter a "user name" and a "password," for example. Upon being presented with the log-in screen, the user can enter the user name and the password, for example, in a UI 404 (FIG. 4B). The business software environment 100, and more particularly, the first business computer system 102 can authenticate the user of the first client device 120 as being an authorized user. Then, the first business computer system 102 can cause the UI 406 to be displayed on the display device 212.

The example UI 406 (FIG. 4C) is a sales UI that includes a navigation structure on the left (displaying "HOME," "WORKLIST," "Sales Management," "Self Services," and "REPORTS"). In a "HOME" screen, the UI 406 displays "Favorite Tasks" that represent, for example, frequently performed tasks. In addition, the UI 406 includes a "Sales Dashboard" that displays one or more headlines including pie charts, column graphs, and the like. Assuming that the user has not previously consented to participate in gamification, the gamification engine 110 can display a participation request UI 408 (FIG. 4D) on the display device. The user may select "Yes" indicating that the user wishes to participate in gamification. This triggers the gathering of gamification data, for example, by the gamification logic (not shown) implemented in the UI.

As a first task, the user can select "Create sales order" in UI 410 (FIG. 4E). The gamification logic can track the selection as part of gathering gamification data and transmit the data to the gamification engine 110. In response, the gamification engine 110 can display an "Award Notification" in the UI 410 indicating that the user has received an award for creating a sales order. When the user selects "Create sales order" in UI 410, the UI can be presented with a sales order creation UI 412 (FIG. 4F) in which the user can enter details of the transaction. The gamification logic can track each entry in the UI 412 as part of gathering gamification data. Once the user completes entering the transaction details and saves the sales order, the gamification logic can track the completion of the sales order and communicate the completion to the gamification engine 110, which, in response, can display an award notification in UI 414 (FIG. 4G) indicating that the user has received another award for completing the creation of a sales order.

The user can then return to the "HOME" screen by selecting "HOME," causing the "HOME" screen to be displayed in UI 416 (FIG. 4H). The user may then desire to view reports on the user's performance in gamification. To do so, the user can open a side panel region in which the user can then select a "Reporting" option shown in UI 418 (FIG. 4I). In response, multiple headlines, including pie charts, column graphs, and the like, as well as one or more link lists can be displayed in a section of the UI 418. When the user selects the "Reporting" icon, a drop-down menu can be displayed in the UI 420 (FIG.

4J). One of the options in the drop-down menu can include "Award Systems," a selection of which can cause the users performance measures to be displayed.

When the user selects the "Award Systems" icon, information describing performance measures can be displayed in the UI 422 (FIG. 4K). The information can include the users total performance measures in one or more categories, for example, "Gold," "Silver," "Bronze," and the like, a completeness measure indicated by a percentage, for example, "3%" and by an arrow on a scale, recent achievements of the user, and a leaderboard displaying identities of gamification leaders. Having viewed the information about the gamification performance, the user can collapse the side panel again, returning to the "HOME" screen in UI 424 (FIG. 4L). Because the side panel is considered as a supportive element in the business flow, an award notification can be displayed in UI 424 indicating that the user has been awarded for closing the side panel (FIG. 4L). To view additional information about performance, the user can select to expand the side panel again and select "Recent Achievements" in UI 426 (FIG. 4M) causing the UI 428 (FIG. 4N) to be displayed. In the UI 428, the gamification engine 110 can display the user's various achievements including, for example, an "Overview of Achievements," "Application Achievements," and the like. The user can then close the UI 428 causing the UI 430 (FIG. 4O) to be displayed.

Figure 5:
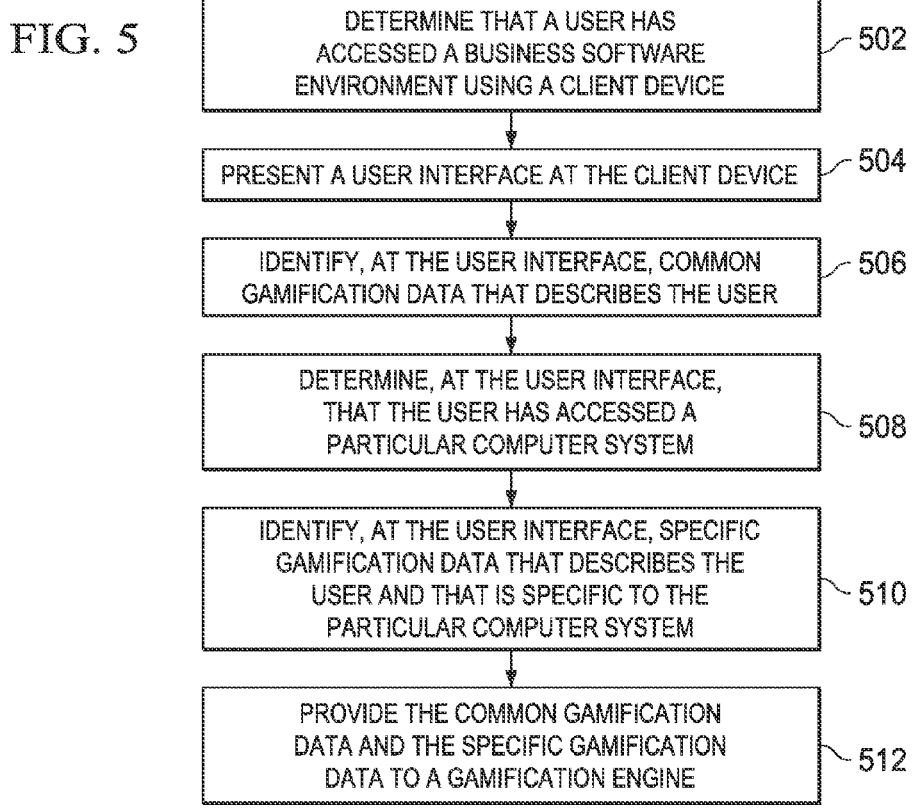
FIG. 5 illustrates an example flowchart for gathering gamification data from computer systems that implement business software.

FIG. 5 illustrates an example flowchart 500 for gathering gamification data from computer systems that implement business software. At 502, it is determined that a user has accessed a business software environment that includes multiple computer systems using a client device. Each computer system implements respective computer software applications to perform respective operations. At 504, a user interface is presented at the client device. At 506, common gamification data is identified at the user interface in response to receiving a request from a gamification engine that is connected to the business software environment. In some implementations, as described above, the gamification engine is connected to the client device that is also separately connected to a computer system of the business environment. The gamification engine provides the request to and receives the common gamification data from the client device. As described above, the user interface executes a gamification logic to collect the common gamification data. Consequently, the gamification engine may not be connected directly to any of the computer systems in the business environment.

At 508, it can be determined at the user interface that the user has accessed a particular computer system of the multiple computer systems. At 510, in response to receiving a request for specific gamification data that describes the user and that is specific to gamification in the particular computer system from the gamification engine, the specific gamification data can be identified at the user interface, for example, by executing the gamification logic. At 512, the common gamification data and the specific gamification data can be provided to the gamification engine in response to the respective requests for the data.

By implementing the techniques described here, the gamification engine 110 can provide a design time environment for gamification setup, a runtime environment which receives and provides gamification data, and reporting, and a UI framework that enables connectivity between the various business computer systems in the business software environment 100 and the gamification engine 110. The gamification engine 110 can maintain gamification metadata in the design time environment, for example, identities of applications that are relevant for gamification. The gamification engine 110 can further provide gamification relevant metadata, for example, to identify gamification relevant applications, through a well-defined application programming interface (API). The gamification engine 110 can also provide services for collecting incoming data, user interfaces that can post gamification results (for example, based on HTTP/HTTPS), and other gamification services such as, for example, leader boards, or UIs to dedicated leader board servers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium, for example, the computer-readable medium 206, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus, for example, data processing apparatus 205, on data stored on one or more computer-readable storage devices or received from other sources. In some implementations, the techniques described here can be implemented in a cloud computing environment. For example, a user can access the business software environment described here via a cloud to which the user's client device is connected. Gamification data can be collected and transmitted to a cloud in which the data can be stored. The gamification engine can retrieve the data from the cloud.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network, for example, network 112. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   determining that a user has accessed a business software environment including a plurality of business computer systems using a client device that is connected to the business software environment, each business computer system implementing respective business computer software applications to perform respective business operations, the plurality of business computer systems including at least one of a sales computer system, a production computer system, or a marketing computer system;
   determining that the user has accessed a particular business computer system of the plurality of business computer systems, wherein the particular business computer system implements business computer software applications to perform business operations that are unique to the particular business computer system;
   identifying a user interface displayed at the client device by the particular business computer system, the user interface displayed by executing a gamification logic in a user interface client infrastructure executed by the particular business computer system without modifying a business software application executed by the particular business computer system;
   receiving, through the user interface, consent from the user to participate in gamification;
   in response to receiving consent from the user to participate in gamification, tracking interactions by the user with the user interface displayed at the client device, the interactions comprising inputs through the user interface by the user to the business software environment and the particular business computer system, and outputs on the user interface by the business software environment and the particular business computer system in response to the inputs;
   receiving, from a gamification engine connected to the business software environment, a first request for common gamification data and a second request for specific gamification data, the common gamification data describing the user of the business software environment and the specific gamification data describing the user and being specific to gamification in the particular business computer system;
   identifying the common gamification data and the specific gamification data based on tracking the interactions by the user with the user interface, the common gamification data including at least a portion of authentication data that the user provides to be authenticated as an authorized user of the business software environment and the specific gamification data including at least a portion of the inputs through the user interface by the user to the business software environment and the particular business computer system, the portion of the inputs indicative of the user's performance; and
   providing the common gamification data and the specific gamification data to the gamification engine in response to receiving the first request and the second request, respectively.

2. The method of claim 1, wherein the interactions comprise operations performed at the user interface, the operations including one or more of operations performed by the user through the user interface, operations implemented by the business software environment through the user interface, or operations implemented by the particular business computer system through the user interface.

3. The method of claim 1, wherein the user is authorized to access a navigation structure assigned to an account on the plurality of business computer systems that is associated with the user, wherein the navigation structure references a plurality of applications that the user is authorized to access, and wherein determining that the user has accessed the particular business computer system comprises:
   displaying the navigation structure in the user interface; and
   determining that the user has selected a portion of the navigation structure that is specific to the particular business computer system.

4. The method of claim 3, wherein the specific gamification data includes:
   gamification data that the user provides to or receives through the user interface;
   gamification data received from a business computer software framework provided by the particular system in response to executing instructions to present the user interface; and
   gamification data received from the business computer system based on interactions between the user and the particular business computer system.

5. The method of claim 3, wherein the gamification engine determines a performance measure based on the common gamification data and the specification data, and wherein the method further comprises providing the gamification performance measure to the user through the user interface.

6. The method of claim 5, wherein providing the gamification performance measure to the user comprises displaying the gamification performance measure in the user interface.

7. The method of claim 1, further comprising:
   receiving, from the gamification engine, a plurality of tasks frequently performed by the user, one or more awards received by the user, and one or more reports describing the user's performance in gamification; and
   displaying the plurality of tasks frequently performed by the user, the one or more awards received by the user, and the one or more reports describing the user's performance in gamification in the user interface.

8. A non-transitory computer-readable medium tangibly encoding computer program instructions executable by data processing apparatus to perform operations comprising:
   determining that a user has accessed a business software environment including a plurality of business computer systems using a client device that is connected to the business software environment, each business computer system implementing respective business computer software applications to perform respective business operations, the plurality of business computer systems including at least one of a sales computer system, a production computer system, or a marketing computer system;
   determining that the user has accessed a particular business computer system of the plurality of business computer systems, wherein the particular business computer system implements business computer software applications to perform business operations that are unique to the particular business computer system;
   identifying a user interface displayed at the client device by the particular business computer system, the user interface displayed by executing a gamification logic in a user interface client infrastructure executed by the particular business computer system without modifying a business software application executed by the particular business computer system;

receiving, through the user interface, consent from the user to participate in gamification;

in response to receiving consent from the user to participate in gamification, tracking interactions by the user with the user interface displayed at the client device, the interactions comprising inputs through the user interface by the user to the business software environment and the particular business computer system, and outputs on the user interface by the business software environment and the particular business computer system in response to the inputs;

receiving, from a gamification engine connected to the business software environment, a first request for common gamification data and a second request for specific gamification data, the common gamification data describing the user of the business software environment and the specific gamification data describing the user and being specific to gamification in the particular business computer system;

identifying the common gamification data and the specific gamification data based on tracking the interactions by the user with the user interface, the common gamification data including at least a portion of authentication data that the user provides to be authenticated as an authorized user of the business software environment and the specific gamification data including at least a portion of the inputs through the user interface by the user to the business software environment and the particular business computer system, the portion of the inputs indicative of the user's performance; and providing the common gamification data and the specific gamification data to the gamification engine in response to receiving the first request and the second request, respectively.

9. The medium of claim 8, the interactions comprise operations performed at the user interface, the operations including one or more of operations performed by the user through the user interface, operations implemented by the business software environment through the user interface, or operations implemented by the particular business computer system through the user interface, and wherein identifying the common gamification data and the specific gamification data at the user interface comprises identifying the common gamification data and the specific gamification data based on monitoring the operations.

10. The medium of claim 8, wherein the user is authorized to access a navigation structure assigned to an account on the plurality of business computer systems that is associated with the user, wherein the navigation structure references a plurality of applications that the user is authorized to access and wherein determining that the user has accessed the particular business computer system comprises:

displaying the navigation structure in the user interface; and determining that the user has selected a portion of the navigation structure that is specific to the particular business computer system.

11. The medium of claim 10, wherein the specific gamification data includes:

gamification data that the user provides to or receives through the user interface;

gamification data received from a business computer software framework provided by the particular system in response to executing instructions to present the user interface; and gamification data received from the business computer system based on interactions between the user and the particular business computer system.

12. The medium of claim 10, wherein the gamification engine determines a performance measure based on the common gamification data and the specification data, and wherein the method further comprises providing the gamification performance measure to the user through the user interface.

13. The medium of claim 12, wherein providing the gamification performance measure to the user comprises displaying the gamification performance measure in the user interface.

14. The medium of claim 8, the operations further comprising:

receiving, from the gamification engine, a plurality of tasks frequently performed by the user, one or more awards received by the user, and one or more reports describing the user's performance in gamification; and displaying the plurality of tasks frequently performed by the user, the one or more awards received by the user, and the one or more reports describing the user's performance in gamification in the user interface.

15. A system comprising:

one or more data processing apparatus; and a non-transitory computer-readable medium tangibly encoding computer program instructions executable by the one or more data processing apparatus to perform operations comprising:

determining that a user has accessed a business software environment including a plurality of business computer systems using a client device that is connected to the business software environment, each business computer system implementing respective business computer software applications to perform respective business operations, the plurality of business computer systems including at least one of a sales computer system, a production computer system, or a marketing computer system;

determining that the user has accessed a particular business computer system of the plurality of business computer systems, wherein the particular business computer system implements business computer software applications to perform business operations that are unique to the particular business computer system;

identifying a user interface displayed at the client device by the particular business computer system, the user interface displayed by executing a gamification logic in a user interface client infrastructure executed by the particular business computer system without modifying a business software application executed by the particular business computer system;

receiving, through the user interface, consent from the user to participate in gamification;

in response to receiving consent from the user to participate in gamification, tracking interactions by the user with the user interface displayed at the client device, the interactions comprising inputs through the user interface by the user to the business software environment and the particular business computer system, and outputs on the user interface by the business software environment and the particular business computer system in response to the inputs;

receiving, from a gamification engine connected to the business software environment, a first request for common gamification data and a second request for specific gamification data, the common gamification data describing the user of the business software environment and the specific gamification data describing the user and being specific to gamification in the particular business computer system;

identifying the common gamification data and the specific gamification data based on tracking the interactions by the user with the user interface, the common gamification data including at least a portion of authentication data that the user provides to be authenticated as an authorized user of the business software environment and the specific gamification data including at least a portion of the inputs through the user interface by the user to the business software environment and the particular business computer system, the portion of the inputs indicative of the user's performance; and providing the common gamification data and the specific gamification data to the gamification engine in response to receiving the first request and the second request, respectively.

16. The system of claim 15, wherein the interactions comprise operations performed at the user interface, the operations including one or more of operations performed by the user through the user interface, operations implemented by the business software environment through the user interface, or operations implemented by the particular business computer system through the user interface, and wherein identifying the common gamification data and the specific gamification data at the user interface comprises identifying the common gamification data and the specific gamification data based on monitoring the operations.

17. The system of claim 15, wherein the user is authorized to access a navigation structure assigned to an account on the plurality of business computer systems that is associated with the user, wherein the navigation structure references a plurality of applications that the user is authorized to access, and wherein determining that the user has accessed the particular business computer system comprises:

displaying the navigation structure in the user interface; and determining that the user has selected a portion of the navigation structure that is specific to the particular business computer system.

18. The system of claim 17, wherein the specific gamification data includes:

gamification data that the user provides to or receives through the user interface;

gamification data received from a business computer software framework provided by the particular system in response to executing instructions to present the user interface; and gamification data received from the business computer system based on interactions between the user and the particular business computer system.

19. The system of claim 17, wherein the gamification engine determines a performance measure based on the common gamification data and the specification data, and wherein the method further comprises providing the gamification performance measure to the user through the user interface.

20. The system of claim 19, wherein providing the gamification performance measure to the user comprises displaying the gamification performance measure in the user interface.

21. The system of claim 15, the operations further comprising:

receiving, from the gamification engine, a plurality of tasks frequently performed by the user, one or more awards received by the user, and one or more reports describing the user's performance in gamification; and displaying the plurality of tasks frequently performed by the user, the one or more awards received by the user, and the one or more reports describing the user's performance in gamification in the user interface.

\* \* \* \* \*